(12) United States Patent
Mizunaga

(10) Patent No.: US 12,267,391 B2
(45) Date of Patent: Apr. 1, 2025

(54) NETWORK APPARATUS

(71) Applicant: MITUTOYO CORPORATION, Kawasaki (JP)

(72) Inventor: Takuma Mizunaga, Miyazaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 933 days.

(21) Appl. No.: 17/236,061

(22) Filed: Apr. 21, 2021

(65) Prior Publication Data

US 2021/0333079 A1 Oct. 28, 2021

(30) Foreign Application Priority Data

Apr. 27, 2020 (JP) ................................. 2020-078000

(51) Int. Cl.
*G06F 13/42* (2006.01)
*H04L 67/12* (2022.01)

(52) U.S. Cl.
CPC .......... *H04L 67/12* (2013.01); *G06F 13/4282* (2013.01)

(58) Field of Classification Search
CPC ...... G06F 13/42; G06G 13/4282; H04L 67/12
See application file for complete search history.

(56) References Cited

U.S. PATENT DOCUMENTS 5,321,813 A * 6/1994 McMillen ............. H04L 49/358
714/E11.01
6,128,306 A * 10/2000 Simpson ............. H04Q 11/0478
370/413

(Continued)

FOREIGN PATENT DOCUMENTS

JP 2001-156801 A 6/2001
JP 3299488 B2 7/2002

OTHER PUBLICATIONS

T. Ito, J. Kitamichi, K. Kuroda and Y. Okuyama, "A master-slave adaptive load-distribution processor model on PCA," 19th IEEE International Parallel and Distributed Processing Symposium, Denver, CO, USA, 2005, pp. 8 pp.*

(Continued)

*Primary Examiner* — Pierre Michel Bataille
(74) *Attorney, Agent, or Firm* — Oblon, McClelland, Maier & Neustadt, L.L.P.

(57) ABSTRACT

ID numbers of connected multiple modules are easily automatically set.
Each of the multiple modules includes an ID number information holding unit that holds its own ID number information, a first command generation unit that generates a first command for notifying its rear stage of its own ID number information, a first command output unit that outputs the first command from a rear-stage output port, a second command generation unit that generates a second command for notifying its front stage of its own ID number information and ID number information on its rear-stage modules, a second command output unit that outputs the second command from a front-stage output port, and an ID number information update unit that sets, when the first command is received from a front-stage module, new ID number obtained by adding "1" to the ID number of the front-stage module contained in the received first command as its own ID number information in the ID number information holding unit. Each of the multiple modules outputs the first command and second commands for a predetermined period of time to assign a different ID number to each of the multiple modules connected to a network apparatus.

7 Claims, 25 Drawing Sheets

(56) References Cited

U.S. PATENT DOCUMENTS

| 7,076,636 | B1* | 7/2006 | Chilton | G06F 12/0871 |
| | | | | 712/225 |
| 10,747,700 | B1* | 8/2020 | Sarusi | G06F 13/4045 |
| 2004/0088545 | A1* | 5/2004 | Foster | H04L 63/12 |
| | | | | 726/5 |
| 2010/0185784 | A1 | 7/2010 | De Nie et al. | |
| 2010/0280786 | A1 | 11/2010 | Gorbold et al. | |
| 2018/0227266 | A1 | 8/2018 | Lillie et al. | |
| 2019/0007492 | A1* | 1/2019 | Kojo | H04L 67/04 |
| 2022/0326870 | A1* | 10/2022 | Tatsumi | G06F 3/0689 |

OTHER PUBLICATIONS

Q. Yi, M. Shi and S. Li, "Design of USB-UART interface converter and its FPGA implementation," 2017 IEEE 2nd Advanced Information Technology, Electronic and Automation Control Conference (IAEAC), Chongqing, China, 2017, pp. 1399-1403.*

Combined Chinese Office Action & Search Report issued Apr. 10, 2024 in Chinese Application 202110453235.6, (with English translation), 9 pages.

Japanese Office Action issued Feb. 1, 2024 in Japanese Application No. 2020-078000 with English translation, therein, 6 pgs.

European Office Action issued on Aug. 31, 2022 in European Patent Application No. 21 169 624.0, 7 pages.

Extended European Search Report issued Sep. 7, 2021 in corresponding European Patent Application No. 21169624.0, 7 pages.

Japanese Office Action issued Feb. 1, 2024 in Japanese Application No. 2020-078000 with English translation, 6 pgs.

* cited by examiner

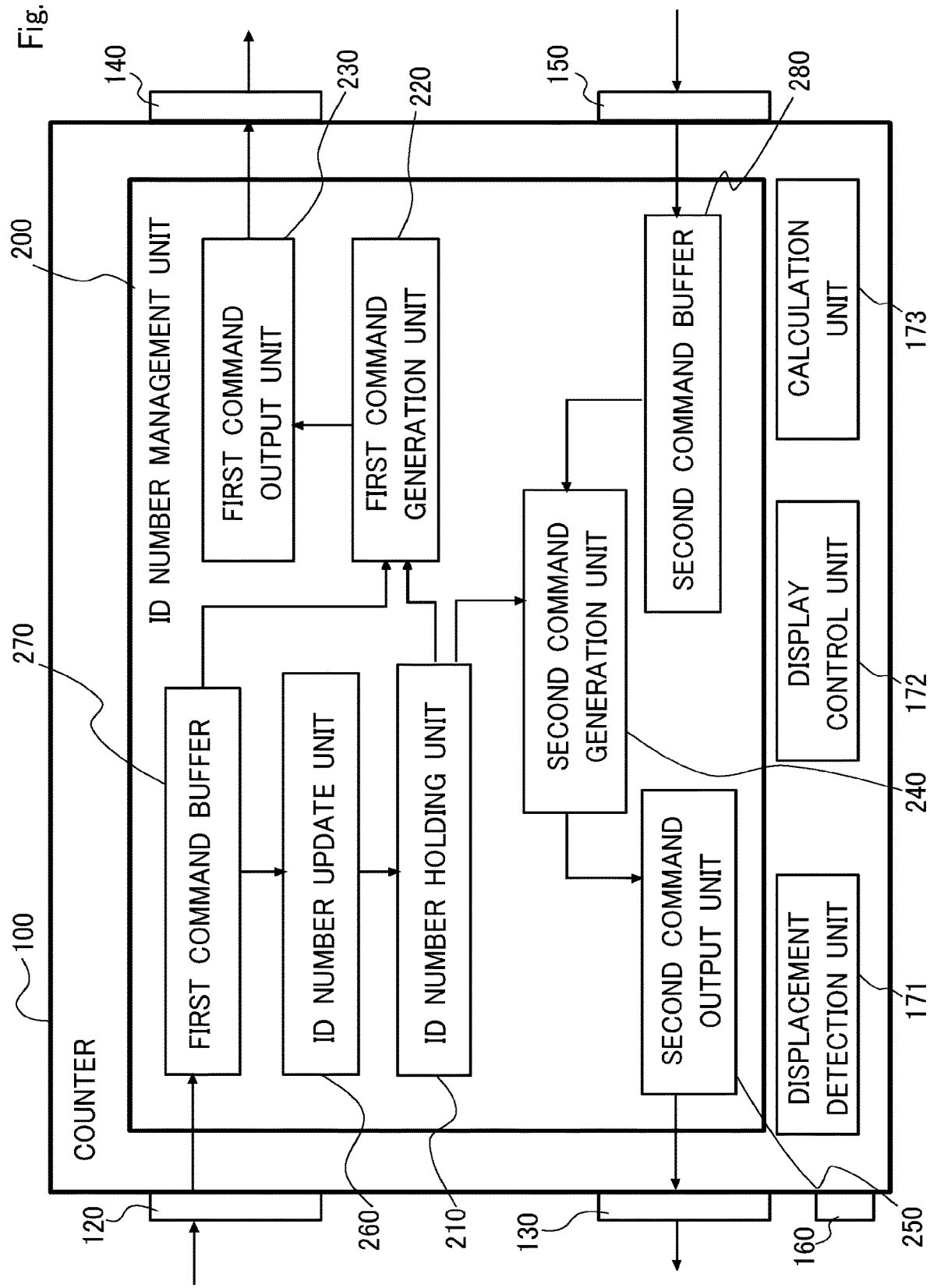

FIRST COMMAND SIGNAL

| HEADER | COMMAND TYPE | ID NUMBER INFORMATION ON UPPER-LEVEL MODULE | ITS OWN ID NUMBER INFORMATION | FOOTER |
|---|---|---|---|---|
| | | (1 BYTE) | (2 BYTES) | |

Fig. 3A

SECOND COMMAND SIGNAL

| HEADER | COMMAND TYPE | ITS OWN ID NUMBER INFORMATION AND ID NUMBER INFORMATION ON REAR-STAGE COUNTERS | FOOTER |
|---|---|---|---|
| | | (2 TO 18 BYTES) | |

Fig. 3B

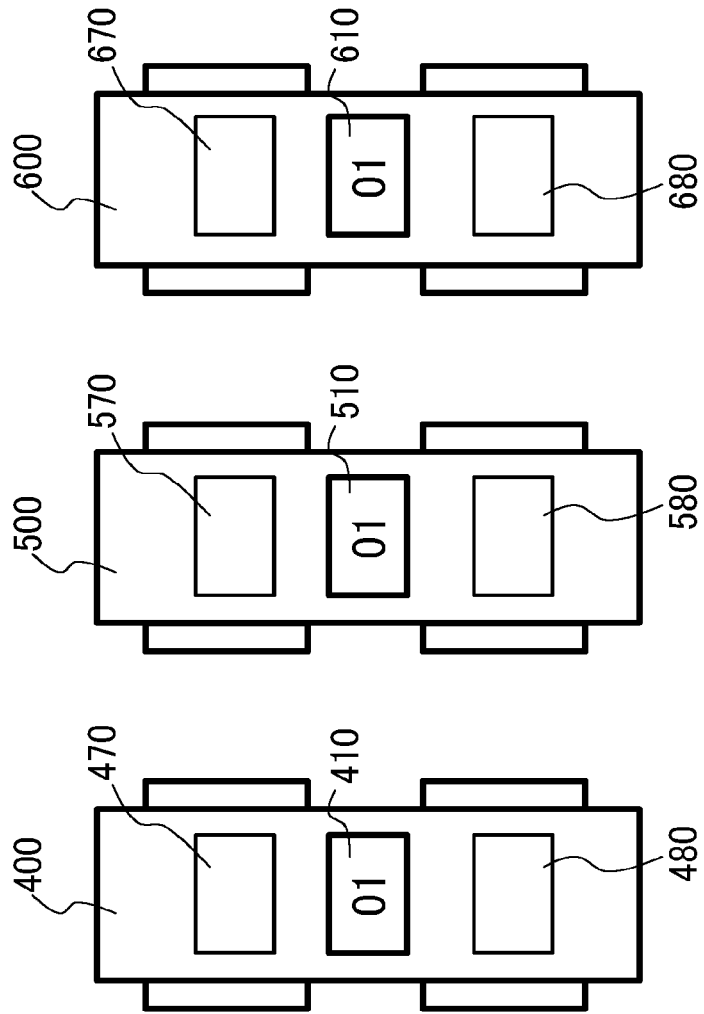

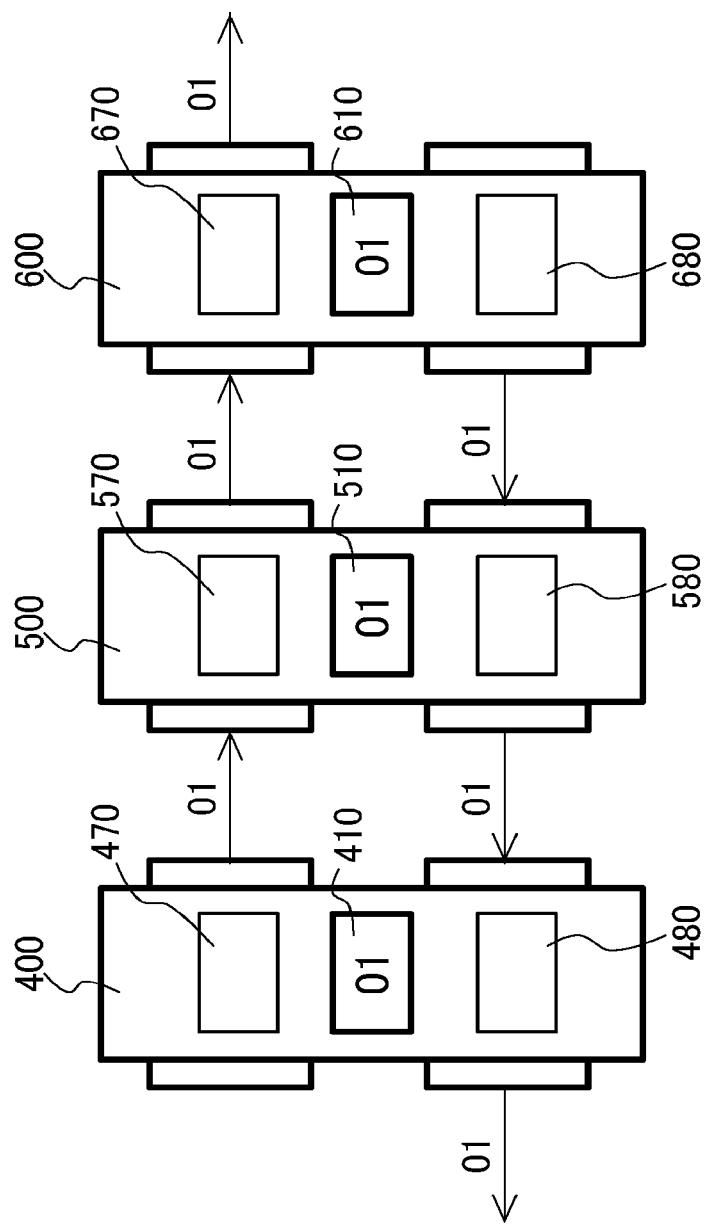

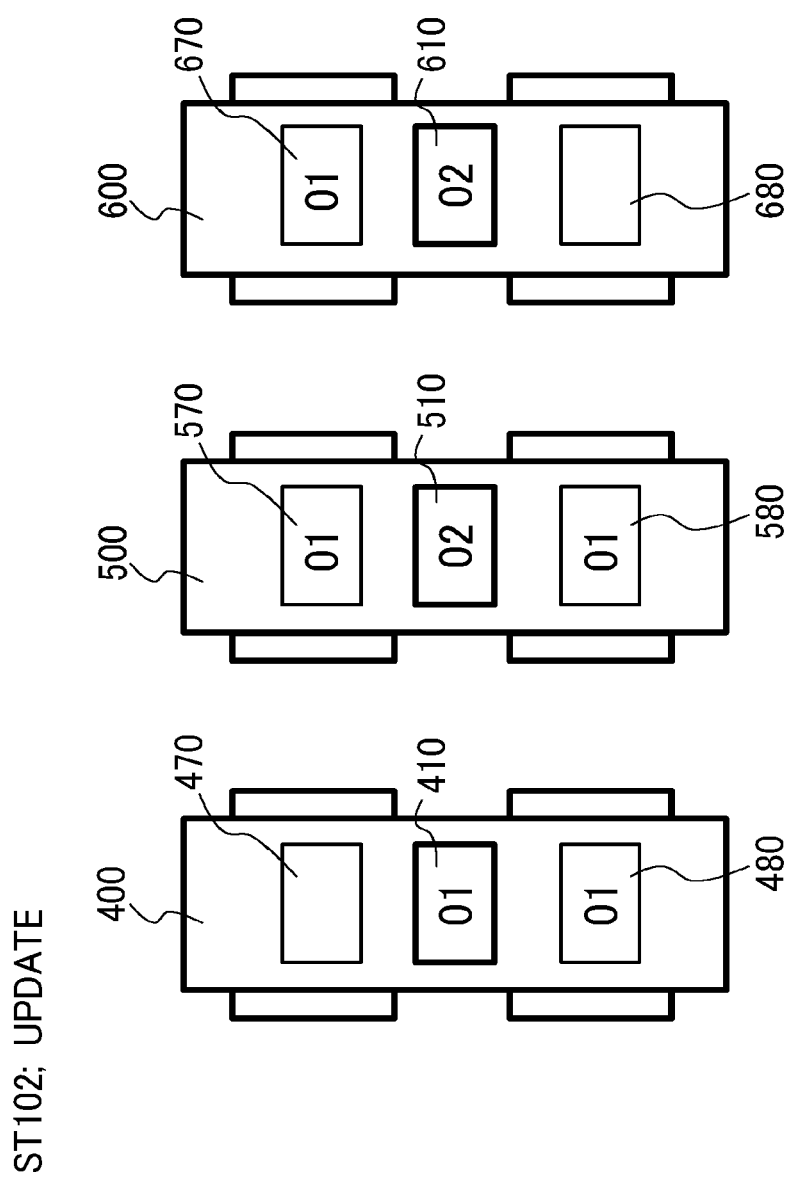

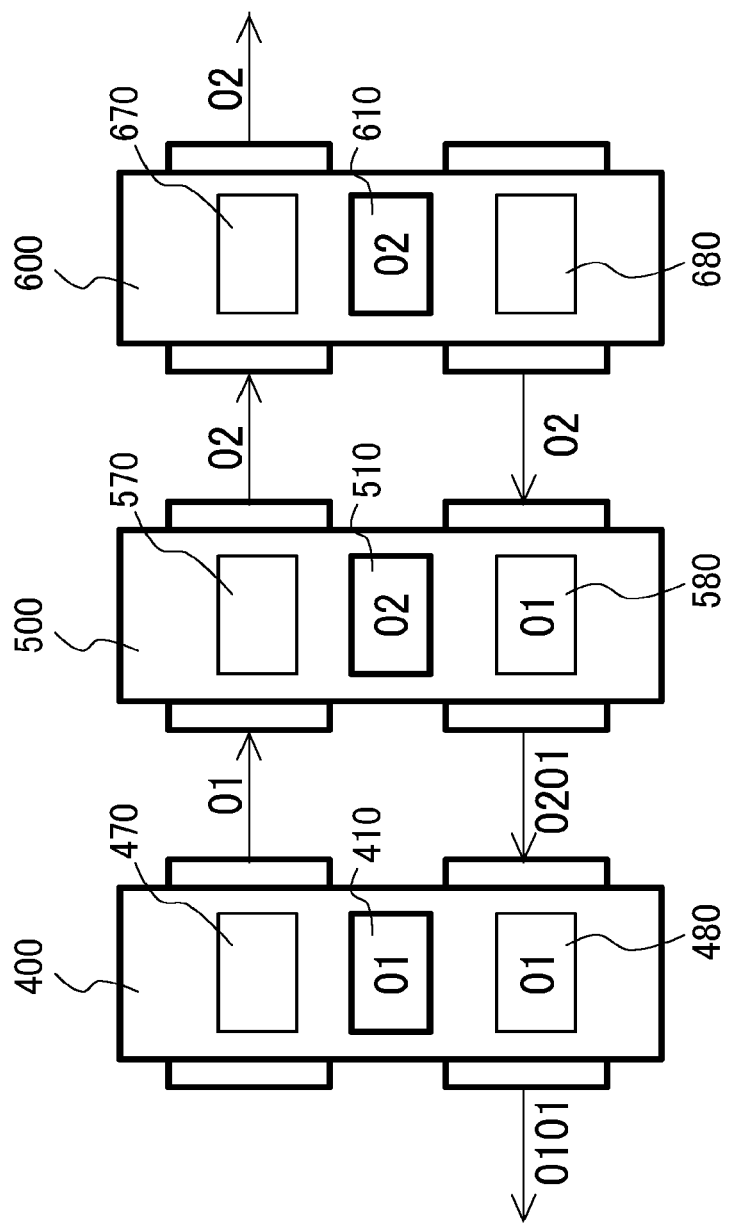

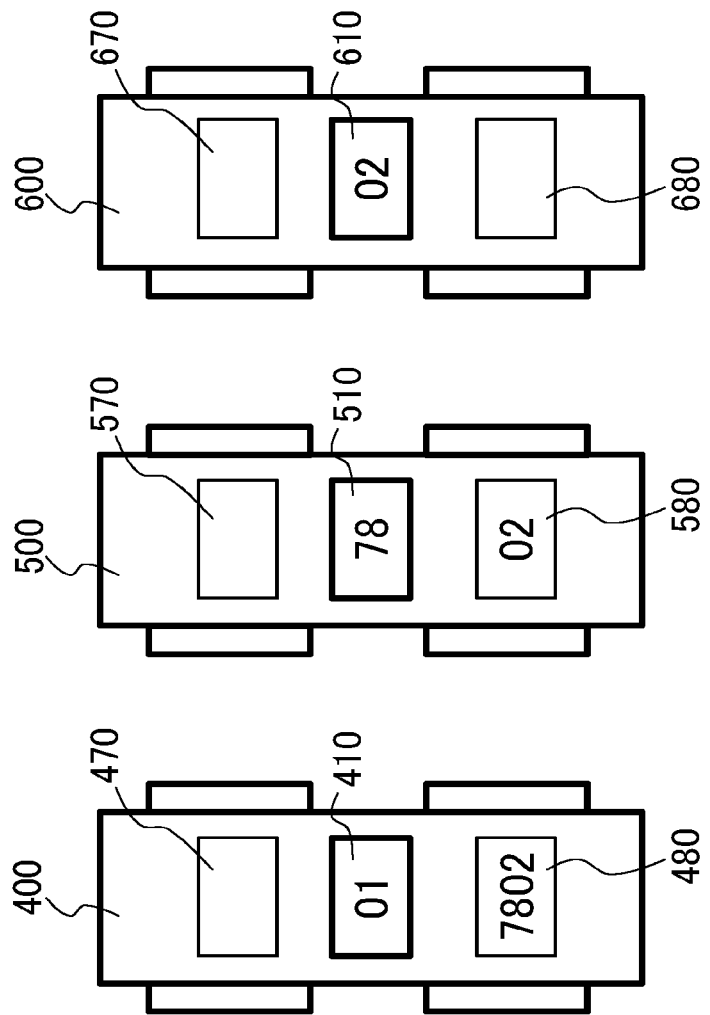

NETWORK APPARATUS

INCORPORATION BY REFERENCE

This application is based upon and claims the benefit of priority from JP patent application No. 2020-078000, filed on Apr. 27, 2020 (DAS code 346A), the disclosure of which is incorporated herein in its entirety by reference.

BACKGROUND OF THE INVENTION

1. Field of the Invention

The present invention relates to a network apparatus, for example, to a technique for automatically setting identification (ID) numbers of multiple module connected to a network apparatus.

2. Description of Related Art

In order to construct, for example, a measurement system that simultaneously measures multiple points, a plurality of measuring machines is desired to be combined to use (JP 3299488). At this time, a plurality of control units (for example, counters) connected to the measuring machines is prepared and connected to an upper-level I/F module or host computer.

(The "connection" may be wired connection or radio connection or may be electric connection or communication connection.)

The communication between the host computer and each of the control units (for example, the counters) is required for the ID number of each of the control units to be appropriately set.

It has been required to write an ID number in a recording medium, such as an EEPROM or the like, in each counter in a separated communication or to set an ID number by designating the ID number by a DIP switch in advance.

In addition, in order to rearrange or add connected counters, the ID numbers have been required to be designated and set again so as not to overlap the numbers of other counters.

Furthermore, if there is a counter whose ID number is desired to be fixed although the order of counters is required to be rearranged instead of arranging the counters in the order of consecutive numbers, setting ID numbers of the counter has been a complicated task.

Moreover, it can be taken time and labor to appropriately set and store ID numbers of counters in an upper-level module (an I/F module or a host computer).

SUMMARY OF THE INVENTION

The present invention is to provide a network apparatus capable of easily automatically setting ID numbers of multiple modules connected to a network.

A network apparatus according to an embodiment of the present invention is a network apparatus including a plurality of modules connected in series, in which
each of the plurality of modules includes:
a front-stage input port that receives a signal from its own front-stage module;
a front-stage output port that outputs a signal to its own front-stage module;
a rear-stage output port that outputs a signal to its own rear-stage module;
a rear-stage input port that receives a signal from its own rear-stage module;
an ID number information holding unit that holds its own ID number information;
a first command generation unit that generates a first command for notifying its own rear-stage module of its own ID number information;
a first command output unit that outputs the first command from the rear-stage output port;
a second command generation unit that generates a second command for notifying its own front-stage module of its own ID number information and ID number information on its rear-stage modules;
a second command output unit that outputs the second command from the front-stage output port; and
an ID number information update unit that sets, when the first command is received from its own front-stage module, new ID number information obtained in predetermined calculation by monotonically increasing or decreasing ID number information on its own front-stage module contained in the received first command as its own ID number information in the ID number information holding unit, and
each of the plurality of modules connected to the network apparatus outputs the first command and the second command a predetermined number of times or for a predetermined period of time to assign a different ID number to each of the plurality of modules connected to the network apparatus.

In an embodiment of the present invention, the ID number information holding unit is preferably, when power is turned on, temporarily set with a minimum number usable as an ID number, and
the ID number information update unit of each of the plurality of modules preferably sets, when the first command is received from its own front-stage module, a value obtained by adding a unit of number to an ID number of its own front-stage module contained in the received first command as its own ID number information in the ID number information holding unit.

In an embodiment of the present invention, a module whose ID number is fixed is preferably connected to the network apparatus, and
the module whose ID number is fixed preferably directly outputs, when the first command is received from its own front-stage module, the received first command as its own first command to its own rear-stage module.

In an embodiment of the present invention, when power of the module whose ID number is fixed is turned on, ID number information contained in the first command firstly output from the module whose ID number is fixed is preferably a value reduced by a unit of number from a minimum number usable as an ID number.

A control method according to an embodiment of the present invention is a control method for a network apparatus that includes a plurality of modules connected in series and assigns an ID number to each of the plurality of modules,
each of the plurality of modules including:
a front-stage input port that receives a signal from its own front-stage module;
a front-stage output port that outputs a signal to its own front-stage module;
a rear-stage output port that outputs a signal to its own rear-stage module;
a rear-stage input port that receives a signal from its own rear-stage module; and
an ID number information holding unit that holds its own ID number information, the control method for the network apparatus including:
a first command generation step of generating a first command for notifying its own rear-stage module of its own ID number information;
a first command output step of outputting the first command from the rear-stage output port;
a second command generation step of generating a second command for notifying its own front-stage module of its own ID number information and ID number information on its rear-stage modules;
a second command output step of outputting the second command from the front-stage output port; and
an ID number information update step of setting, when the first command is received from its own front-stage module, new ID number information obtained in predetermined calculation by monotonically increasing or decreasing ID number information on its own front-stage module contained in the received first command as its own ID number information in the ID number information holding unit, in which
each of the plurality of modules connected to the network apparatus outputs the first command and the second command a predetermined number of times or for a predetermined period of time to assign a different ID number to each of the plurality of modules connected to the network apparatus.

A module according to an embodiment of the present invention is a module that sets its own ID number, the module including:
a front-stage input port that receives a signal from its own front-stage module;
a front-stage output port that outputs a signal to its own front-stage module;
a rear-stage output port that outputs a signal to its own rear-stage module;
a rear-stage input port that receives a signal from its own rear-stage module;
an ID number information holding unit that holds its own ID number information;
a first command generation unit that generates a first command for notifying its own rear-stage module of its own ID number information;
a first command output unit that outputs the first command from the rear-stage output port;
a second command generation unit that generates a second command for notifying its own front-stage module of its own ID number information and ID number information on its rear-stage modules;
a second command output unit that outputs the second command from the front-stage output port; and
an ID number information update unit that sets, when the first command is received from its own front-stage module, new ID number information obtained in predetermined calculation by monotonically increasing or decreasing ID number information on its own front-stage module contained in the received first command as its own ID number information in the ID number information holding unit, in which
the module includes a plurality of modules, and
each the plurality of modules connected to a network apparatus outputs the first command and the second command a predetermined number of times or for a predetermined period of time to assign a different ID number to each of the plurality of modules.

A module ID number management program according to an embodiment of the present invention is a program that manages an ID number of a module, the module incorporating a computer and including:
a front-stage input port that receives a signal from its own front-stage module;
a front-stage output port that outputs a signal to its own front-stage module;
a rear-stage output port that outputs a signal to its own rear-stage module; and
a rear-stage input port that receives a signal from its own rear-stage module, the program causing the computer to function as:
an ID number information holding unit that holds its own ID number information;
a first command generation unit that generates a first command for notifying its own rear-stage module of its own ID number information;
a first command output unit that outputs the first command from the rear-stage output port;
a second command generation unit that generates a second command for notifying its own front-stage module of its own ID number information and ID number information on its rear-stage modules;
a second command output unit that outputs the second command from the front-stage output port; and
an ID number information update unit that sets, when the first command is received from its own front-stage module, new ID number information obtained in predetermined calculation by monotonically increasing or decreasing ID number information on its own front-stage module contained in the received first command as its own ID number information in the ID number information holding unit, in which
the module includes a plurality of modules, and
each the plurality of modules connected to a network apparatus outputs the first command and the second command a predetermined number of times or for a predetermined period of time to assign a different ID number to each of the plurality of modules.

BRIEF DESCRIPTION OF THE DRAWINGS

FIG. 2 is a diagram showing a functional block diagram of a counter;
FIGS. 3A and 3B are diagrams showing data format examples of a first command signal and a second command signal;
FIG. 4 is a diagram for explaining, as a first operation example, an operation for automatically setting ID numbers of three counters;
FIG. 5 is a diagram for explaining the first operation example;
FIG. 6 is a diagram for explaining the first operation example;
FIG. 7 is a diagram for explaining the first operation example.

FIG. 25 is a diagram showing that the ID numbers are settled in the second operation example.

DETAILED DESCRIPTION

Figure 1:
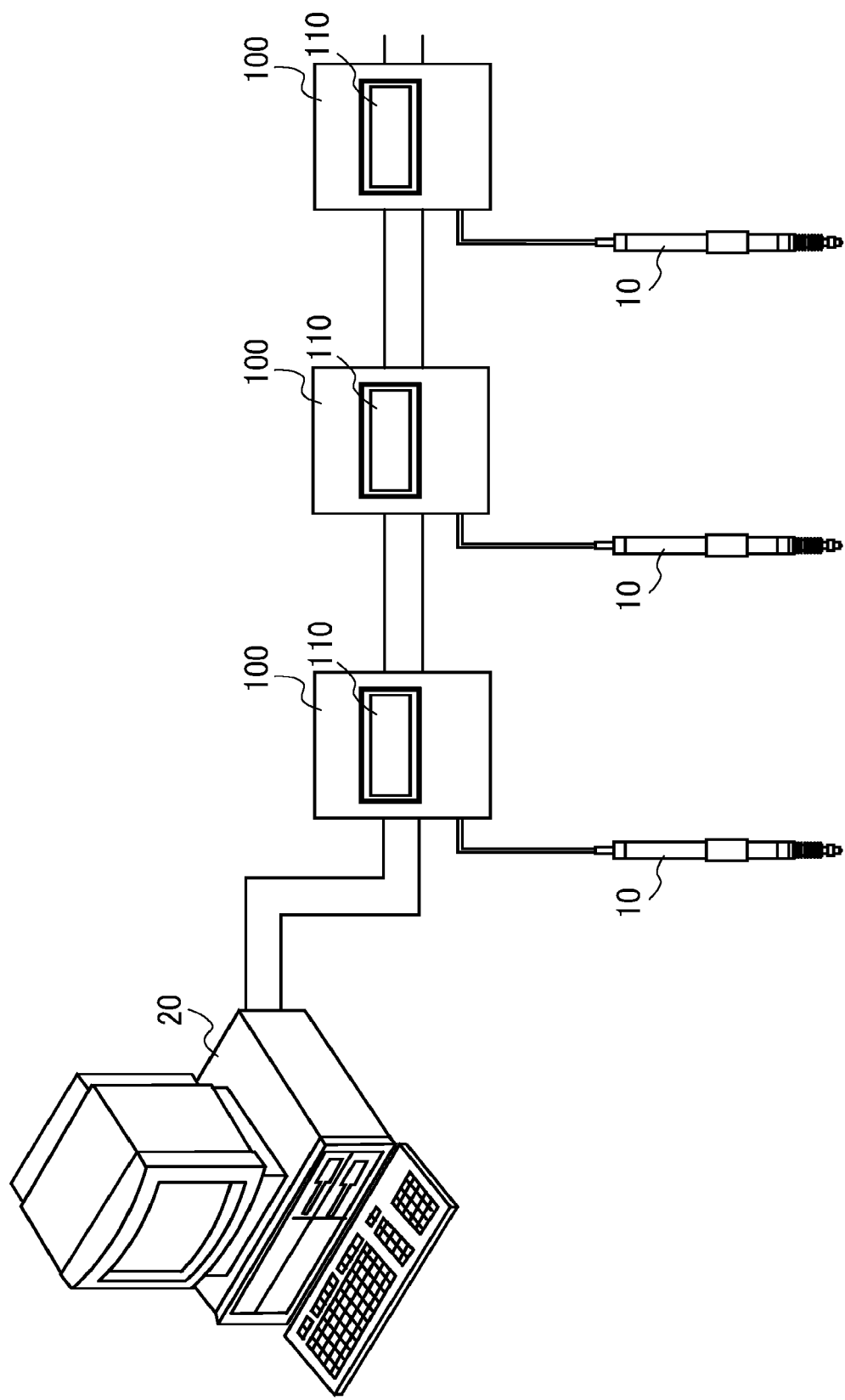
FIG. 1 is a diagram showing an example of a measurement system.

An embodiment of the present invention is illustrated and described with reference to reference signs attached to elements in the drawings.

FIRST EXEMPLARY EMBODIMENT

FIG. 1 shows an example of a measurement system.

The measurement system includes a plurality of digital indicators 10 (also referred to as digital dial gauges or electric micrometers) to simultaneously measure multiple points.

Each indicator 10 includes a main-body cylindrical part, a spindle provided in such a manner as to be slidable with respect to the main-body cylindrical part, and an encoder that detects the displacement of the spindle.

Each indicator 10 is connected to a counter (module) 100.

Here, the counter 100 is a control unit of the indicator 10 and has functions of a detector, a display, a communication device, a simple calculator, and the like. The counter (module)100 is also referred to as a relay unit or a data collecting unit, or may be simply referred to as a small terminal device.

In the measurement system, the counters 100 are connected in series.

The forefront-stage counter 100 is connected to a host computer 20. In addition, an interface (I/F) module may be connected between the forefront-stage counter 100 and the host computer 20, for example.

Here, in order for the host computer 20 to communicate with each counter 100, it is required to have assigned a different ID number to each counter 100 and notified the host computer 20 of the ID number of each counter 100.

FIG. 2 is a functional block diagram of each counter 100.

The counter 100 includes a display 110 and input/output ports 120 to 150 on the outer surface of the housing, and an electric circuit unit inside the housing. The electric circuit unit includes a central processing unit (CPU) and a memory (ROM or RAM), and a program (an ID-number management program) stored in the memory executing by the CPU implements functions as the functional units.

The counter 100 includes, as the input/output ports, a front-stage input port 120, a front-stage output port 130, a rear-stage output port 140, a rear-stage input port 150, and a measuring-machine connection port 160.

The front-stage input port 120 is connected to its own front-stage counter and receives a signal from its own front-stage counter.

The front-stage output port 130 is connected to its own front-stage counter and outputs a signal to its own front-stage counter.

The rear-stage output port 140 is connected to its own rear-stage counter and outputs a signal to its own rear-stage counter.

The rear-stage input port 150 is connected to its own rear-stage counter and receives a signal from its own rear-stage counter.

The measuring-machine connection port 160 is used to be connected to the indicator 10. One counter 100 may be connected to two or more indicators 10, and the counter 100 may include multiple measuring-machine connection ports 160 in that case.

Note that, the front-stage input port 120 and the front-stage output port 130 may not be physically separated, and one front input/output port may function as a front-stage input port and a front-stage output port. Similarly, the rear-stage output port 140 and the rear-stage input port 150 may not be physically separated, and one rear input/output port may function as a front-stage input port and a front-stage output port.

In addition, each counter 100 may separately include an upper-level input/output port to be connected to an upper-level module (a host computer or an I/F module). In the present exemplary embodiment, the front-stage input port 120 or the front-stage output port 130 receives or outputs a signal from or to an upper-level module.

Each counter 100 further includes a displacement detection unit 171, a display control unit 172, a calculation unit 173, and an ID number management unit 200.

The displacement detection unit 171 detects a scale signal from the scale (encoder) incorporated in the indicator 10 to acquire the displacement of the spindle.

The display control unit 172 controls display of the display 110 (for example, an LCD panel) and displays, for example, the acquired displacement amount of the spindle on the display 110.

The calculation unit 173 performs simple calculation, such as origin setting, pre-setting, displaying the maximum and minimum values, range setting, and the like. Then, the counter 100 transmits the detected displacement to the host (the host computer 20), that is, functions as the communication device.

The ID number management unit 200 exchanges ID number information between the front-stage counter and the rear-stage counter to determine its own ID number.

The ID number management unit 200 includes an ID number holding unit 210, a first command generation unit 220, a first command output unit 230, a second command generation unit 240, a second command output unit 250, an ID number update unit 260, a first command buffer 270, and a second command buffer 280.

The ID number holding unit 210 is a memory or a register that holds its own ID number. In order to accept automatic assignment of an ID number, the ID number holding unit 210 is set with a temporary ID number when the power is turned on. In this description, the temporary ID number is assumed to be "01" when the power of the counter 100 is turned on.

Note that, the initial value, which is the temporary ID number when the power of the counter 100 is turned on, is rewritten shortly and is not limited as long as the value is any number that does not change.

However, considering a case in which a counter that accepts automatic assignment of an ID number is placed at the forefront stage, it is preferable that the smallest value of ID numbers that are usable in automatic setting is set to the initial value.

It is assumed that a user can select a fixed ID number to be set in the counter 100.

Here, it is assumed that a value of "50" or larger is used as a fixed ID number and that the user sets an ID number of "50" or larger in the ID number holding unit 210. Then, the counter 100 does not accept automatic assignment of an ID number, and the fixed ID number held by the ID number holding unit 210 is not rewritten.

The first command generation unit 220 generates a first command signal containing its own ID number held by the ID number holding unit 210 as information. However, if the counter 100 is set with a fixed ID number, the first command signal received from the front-stage counter is directly used as its own first command signal.

FIG. 3A shows a data format example of the first command signal.

The first command signal contains, in this order from the head, a header (a start signal), a command type, ID number information on an upper-level module, its own ID number information, and a footer.

The command type is, for example, a command identification code for identifying this command signal as a first command signal or a second command signal, and a preset command identification code of, for example, A, B, 1, 2, or the like is assigned depending on the type of a signal.

The ID number information on an upper-level module is used for transferring, when the host computer 20 or the I/F module is included in the system configuration as an upper-level module of the counter 100, the ID number of the host computer 20 or the I/F module to the rear stage. If the first command signal received from a front-stage (or upper-level) module contains the ID number information on the upper-level module, the counter 100 directly transmits that part to the rear stage. In addition, when the counter 100 has received no first command signal from any other modules and is to firstly transmit a first command signal from itself, the counter 100 sets "ID number information on the upper-level module" as, for example, "0".

The first command output unit 230 outputs the first command signal from the rear-stage output port 140 to its rear-stage counter.

The second command generation unit 240 generates a second command signal containing its own ID number and ID numbers of its rear-stage modules (counters) as information.

FIG. 3B shows a data format example of the second command signal.

The second command signal contains, in this order from the head, a header, a command type, its own ID number and ID numbers of rear-stage counters, and a footer. The second command signal is to be concretely described in an operation example described later.

The second command output unit 250 outputs the second command signal from the front-stage output port 130 to the front-stage counter.

When receiving the first command signal from the front-stage counter, the ID number update unit 260 calculates a value by adding "1" to the ID number contained in the first command signal from the front-stage counter. Then, the ID number update unit 260 updates the ID number held by the ID number holding unit 210 to the calculated value as its own new ID number. However, if a fixed ID number has been set, the ID number update unit 260 is not started and in a sleep mode.

The first command buffer 270 is a memory or a register that temporarily buffers (stores) the first command signal received from the front-stage counter.

The second command buffer 280 is a memory or a register that temporarily buffers (stores) the second command signal received from the rear-stage counter.

The counter 100 inputs/outputs the first command signal and the second command signal at predetermined time intervals (for example, 20 ms intervals) until a predetermined time (for example, two seconds) passes from the time when the power is turned on.

FIRST OPERATION EXAMPLE

An operation example of the present invention is described below.

As a first operation example, ID numbers of three counters 100 are automatically set.

As shown in FIG. 4, the three counters 100 are referred to as a first counter 400, a second counter 500, and a third counter 600 from the left. The first counter 400 is the forefront-stage counter of the three counters and is connected to the host computer 20.

In FIG. 4, the host computer 20 and the indicators 10 are omitted, and only the counters 400, 500, and 600 are shown.

For easily understanding of the operation description, ID number holding units 410, 510, and 610, first command buffers 470, 570, and 670, and second command buffers 480, 580, and 680 are shown as the functional units of the counters 400, 500, and 600. In FIG. 4, the first counter 400, the second counter 500, and the third counter 600 accept automatic assignment of ID numbers, and a temporary ID number "01" is set in each of the ID number holding units 410, 510, and 610 when the power is turned on.

Thereafter, the first counter 400, the second counter 500, and the third counter 600 exchange first command signals and second command signals therebetween to update their own ID numbers and eventually settle their own ID numbers. At this time, each ID number may be displayed on the display 110.

For example, the temporary ID number "01" is displayed on the display 110 of each of the counters 400, 500, and 600 when the power is turned on, and the number displayed on the display 110 is updated as the ID number is updated in an operation described later. When the temporary ID number is displayed, the displayed ID number may be blinked or its color may be changed to notify a user that the ID number is not settled, and the settled ID number may be displayed for a predetermined period of time (for example, 5 or 10 seconds) in a normal manner once the ID number is settled.

FIG. 5 is referred to.

After the power is turned on, each of the counters 400, 500, and 600 outputs a first command signal and a second command signal.

The first command signal is for notifying the rear-stage counter of its own ID number.

Each of the counters 400, 500, and 600 outputs the ID number held by each of the respective ID number holding units 410, 510, and 610 as the first command signal.

At the beginning, each of the counters 400, 500, and 600 has received no first command signal from any other counters, and the ID number has not been updated. Thus, the first command signal output from each of the counters 400, 500, and 600 is its temporary ID number "01" set as the initial value. Each of the counters 400, 500, and 600 outputs the first command signal to its own rear-stage counter.

However, the third counter 600 has no rear-stage counter to output the first command signal to.

The rear-stage output port 140 of the last-stage counter (in this description, the third counter 600) may be attached with a cap to terminate. Alternatively, if a counter has the rear-stage output port 140 attached with an end cap, the counter may output no first command signal.

The second command signal is for notifying the front-stage counter of its own ID number and the ID numbers of its rear-stage counters.

The second command generation unit 240 generates the second command signal by adding its own ID number in front of the ID number information stored in the second command buffer 280 (480, 580, and 680).

In this step (FIG. 5), each of the counters 400, 500, and 600 has received no second command signal from any other counters. At this time, the second command signal output from each of the counters 400, 500, and 600 is its temporary ID "01". Each of the counters 400, 500, and 600 outputs the second command signal to its own the front-stage counter.

Next, FIG. 6 is referred to.

When receiving the first command signal from the front-stage counter, the ID number update unit 260 calculates a value by adding "1" to the ID number contained in the first command signal from the front-stage counter and updates, with the calculated value, the ID number held by the ID number holding unit 210 (410, 510, and 610) as its own new ID number.

The first counter 400 is the forefront-stage counter and receives no first command signal from the front stage, and its own ID number is not updated and remains as the initial value "01".

The second counter 500 and the third counter 600 are described.

Each of the second counter 500 and the third counter 600 has received the first command signal from the front-stage counter in the earlier step (FIG. 5).

Thus, the ID number update unit 260 adds "1" to "01" that is the received first command and overwrites the ID number held by the ID number holding unit 210 (510, 610) to update its own ID number. Then, the ID number of each of the second counter 500 and the third counter 600 becomes "02".

In addition, each of the first counter 400 and the second counter 500 has received the second command signal "01" from the rear-stage counter in the earlier step (FIG. 5). Thus, the second command buffers 480 and 580 of the first counter 400 and the second counter 500 each store the received second command "01".

Next, FIG. 7 is referred to.

Each of the counters 400, 500, and 600 outputs a first command signal and a second command signal.

The first command signal is for notifying the rear-stage counter of its own ID number, and each of the counters 400, 500, and 600 outputs the ID number held by each of the ID number holding units 410, 510, and 610 as the first command signal. That is, the first command signal output from the first counter 400 is "01". The first command signal output from each of the second counter 500 and the third counter 600 is "02".

The second command signal is for notifying the front-stage counter of its own ID number and the ID numbers of its rear-stage counters. The second command generation unit 240 generates the second command signal ay adding its own ID number in front of the ID number information stored by each of the second command buffers 480, 580, and 680.

The third counter 600 is the last-stage counter and receives no second command signal from any other counters, and the second command signal output from the third counter 600 is its own ID number. That is, the second command signal output from the third counter 600 is "02".

The second counter 500 has received the second command signal "01" from the third counter 600 in the earlier step (FIG. 5) and has stored "01" in the second command buffer 580. At this time, the second command generation unit 240 of the second counter 500 generates a second command signal "0201" by adding the stored value "01" to follow its own ID number "02" and outputs the generated second command signal from the front-stage output port 130.

The first counter 400 has received the second command signal "01" from the second counter 500 in the earlier step (FIG. 5) and has stored "01" in the second command buffer 480.

The second command generation unit 240 of the first counter 400 generates a second command signal "0101" by adding the stored value "01" to follow its own ID number "01" and outputs the generated second command signal to the front stage (the host computer 20).

Figure 8:
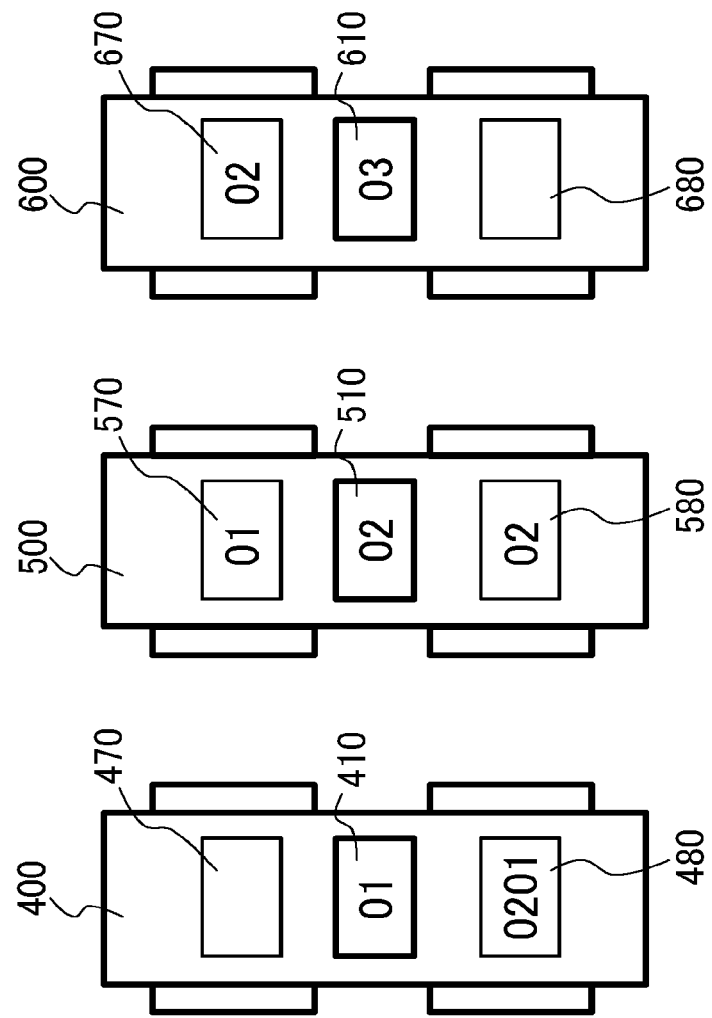
FIG. 8 is a diagram for explaining the first operation example.

Next, FIG. 8 is referred to.

The third counter 600 has received the first command signal "02" from the second counter 500 in the earlier step (FIG. 7). Thus, its own ID number of the third counter 600 is updated to "03". The ID numbers of the first counter 400 and the second counter 500 eventually remain unchanged although updated, and the explanation for them is omitted.

The second command buffers 480 and 580 of the first counter 400 and the second counter 500 are described.

The second command buffer 480 of the first counter 400 stores the second command signal "0201" received from the second counter 500 in the earlier step (FIG. 7).

The second command buffer 580 of the second counter 500 stores the second command signal "02" received from the third counter 600 in the earlier step (FIG. 7).

Figure 9:
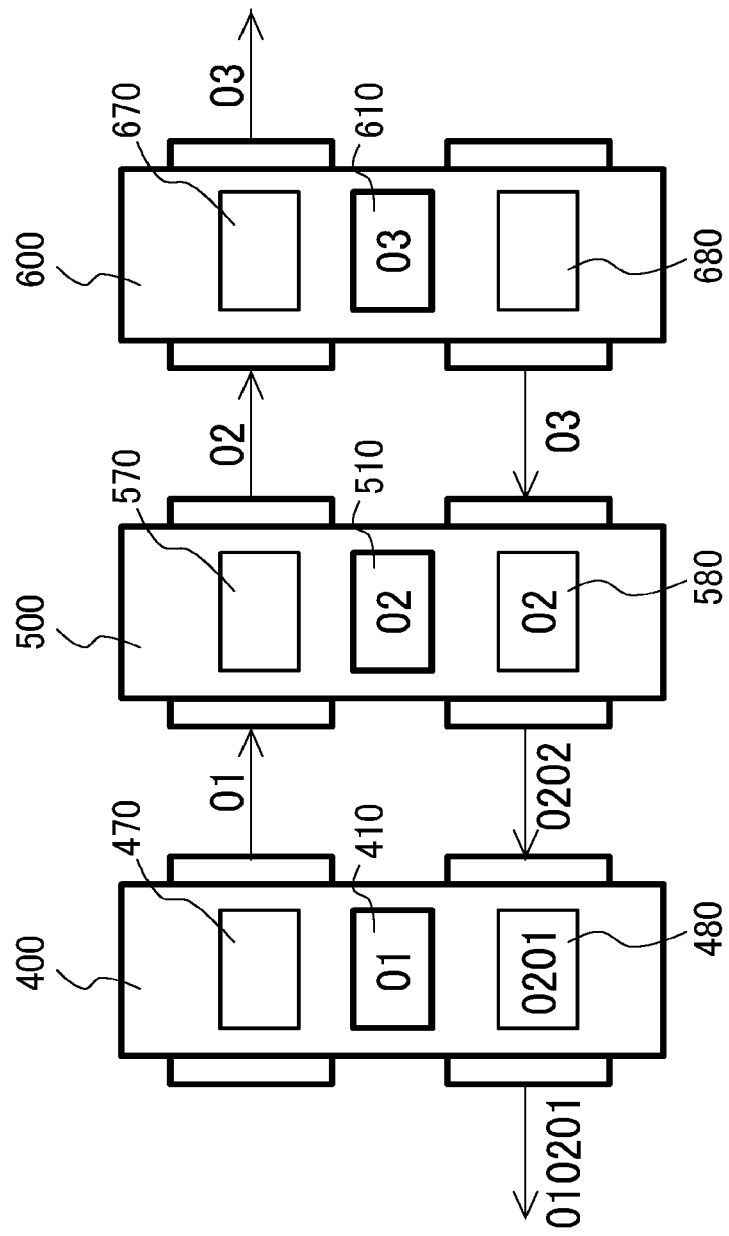
FIG. 9 is a diagram for explaining the first operation example.

Next, FIG. 9 is referred to.

Each of the counters 400, 500, and 600 outputs a first command signal and a second command signal.

The first command signal is for transferring its own ID number, and the first command signal output from the first counter 400 is "01", the first command signal output from the second counter 500 is "02", and the first command signal output from the third counter 600 is "03".

The second command signal is generated by adding its own ID number in front of the ID number information on its rear-stage counters stored in each of the second command buffers 480, 580, and 680.

The second command signal output from the first counter 400 is "010201".

The second command signal output from the second counter 500 is "0202".

The second command signal output from the third counter 600 is "03".

Figure 10:
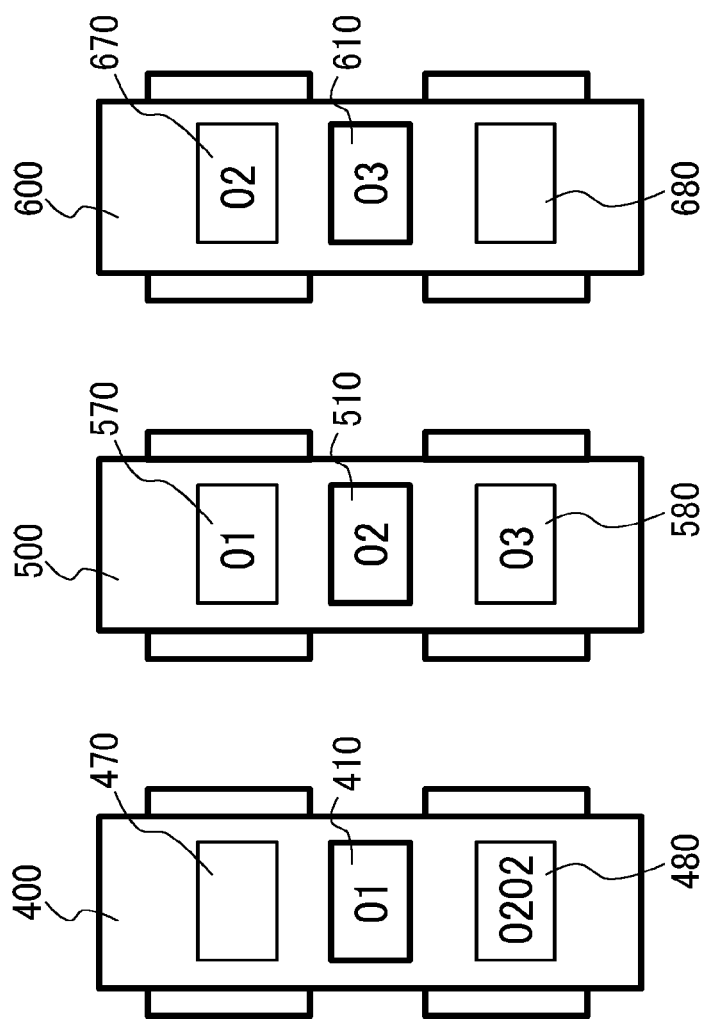
FIG. 10 is a diagram for explaining the first operation example.

Next, FIG. 10 is referred to.

Each of the counters 400, 500, and 600 updates its own ID based on the first command signal received in the earlier step (FIG. 9). However, the ID numbers of the first counter 400, the second counter 500, and the third counter 600 have been increased by "1" from the left.

Thus, the ID numbers eventually remain unchanged before and after the ID numbers are updated in this step (FIG. 10).

Next, the second command buffers 480, 580, and 680 of the counters 400, 500, and 600 are described.

The first counter 400 has received the second command signal "0202" from the second counter 500 in the earlier step (FIG. 9), and the second command buffer 480 of the first counter 400 stores "0202".

The second counter 500 has received the second command signal "03" from the third counter 600 in the earlier step (FIG. 9), and the second command buffer 580 of the second counter 500 stores "03".

Figure 11:
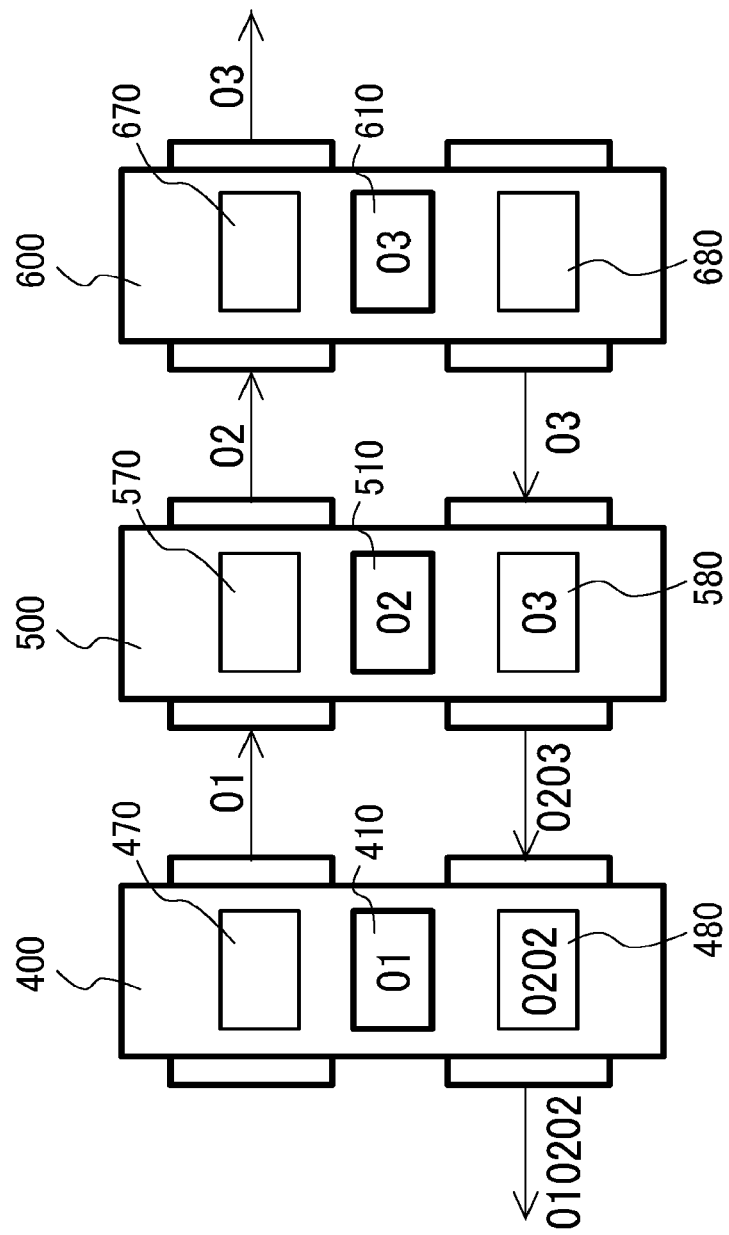
FIG. 11 is a diagram for explaining the first operation example.

Next, FIG. 11 is referred to.

Each of the counters 400, 500, and 600 notifies the rear-stage counter of its own ID number information with a first command signal.

Each ID number has not changed in the earlier step (FIG. 10), and the first command signal output from each of the counters 400, 500, and 600 is the same as that in the step two steps earlier (FIG. 9).

The second command signal output from each of the counters 400, 500, and 600 is described.

The second command signal output from the third counter 600 is its own ID number "03" and the same as that in the earlier step (FIG. 9).

The second counter 500 generates a second command signal "0203" by adding its own ID number "02" in front of "03" that has stored in the second command buffer 580 in the earlier step (FIG. 10).

The first counter 400 generates a second command signal "010202" by adding its own ID number "01" in front of "0202" that has stored in the second command buffer 480 in the earlier step (FIG. 10).

Figure 12:
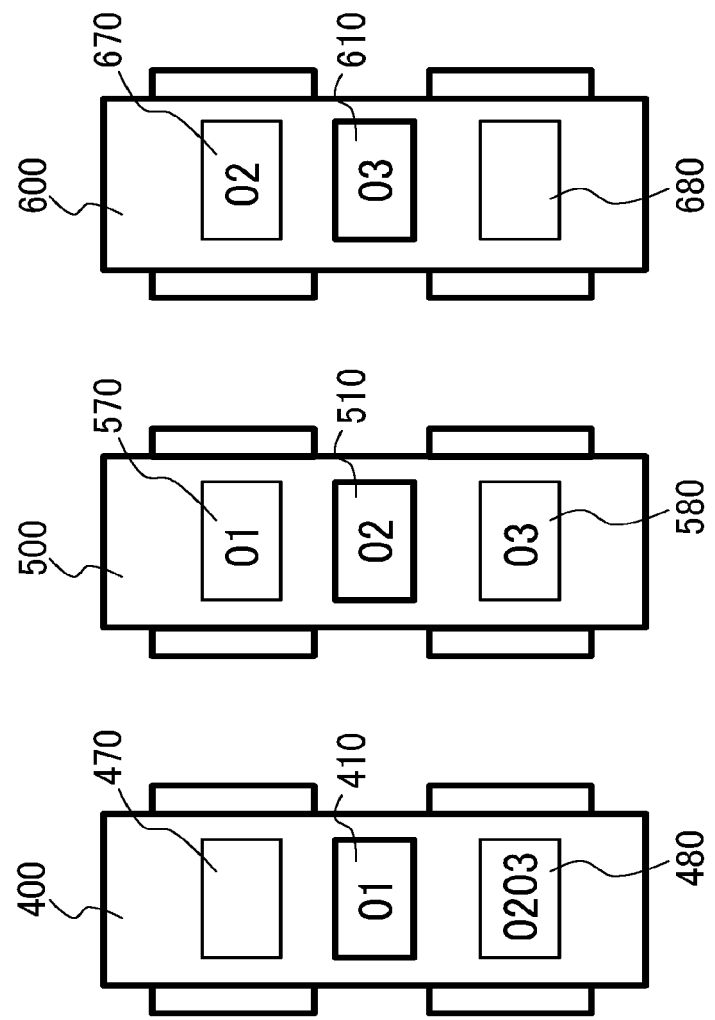
FIG. 12 is a diagram for explaining the first operation example.

Next, FIG. 12 is referred to.

The ID numbers of the counters 400, 500, and 600 have been already increased by "1" from the left in the earlier step (FIG. 8), and the ID numbers remain unchanged although the counters 400, 500, and 600 update the ID numbers.

The second command buffers 480, 580, and 680 of the counters 400, 500, and 600 are described.

The first counter 400 has received the second command signal "0203" from the second counter 500 in the earlier step (FIG. 11), and the second command buffer 480 of the first counter 400 stores "0203".

The second command buffers 580 and 680 of the second counter 500 and the third counter 600 eventually operate similarly in the earlier step (FIG. 10), and a redundant description is omitted.

Figure 13:
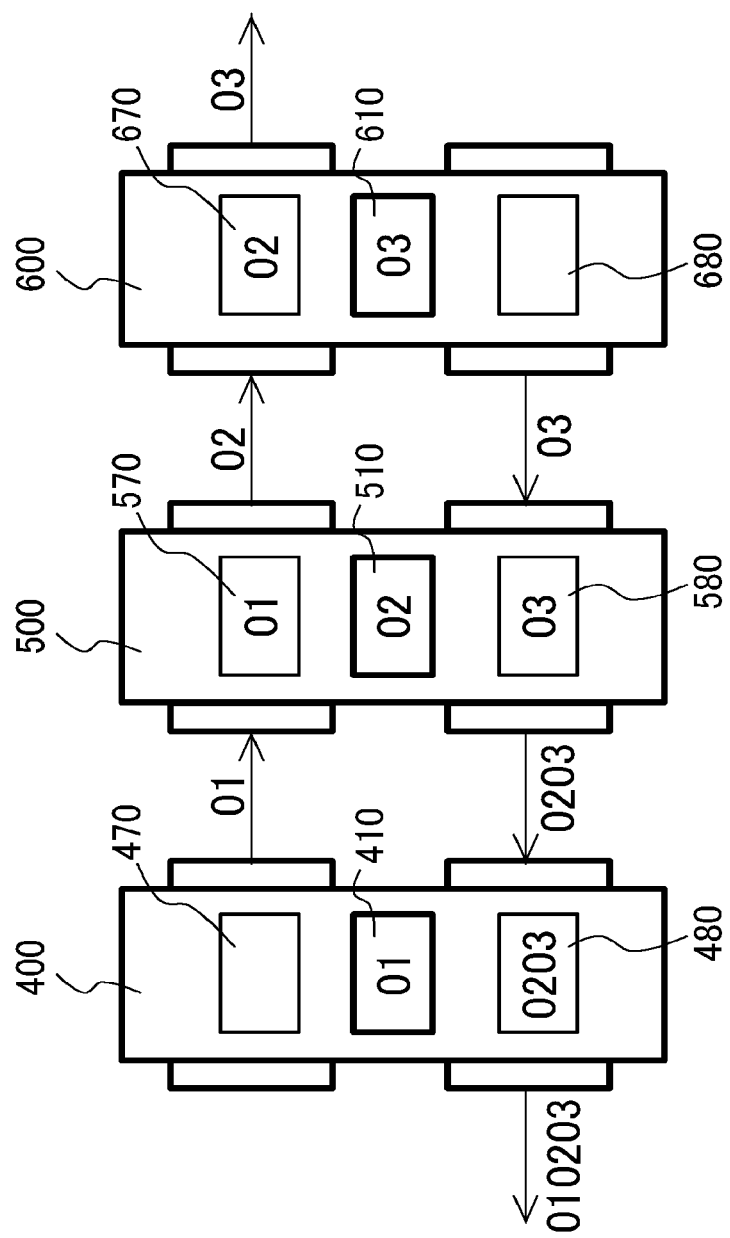
FIG. 13 is a diagram for explaining the first operation example.

FIG. 13 is referred to.

Each of the counters 400, 500, and 600 outputs a first command signal and a second command signal.

The second command signal output from the first counter 400 in this step (FIG. 13) is described.

The first counter 400 generates a second command signal "010203" by adding its own ID number "01" in front of "0203" stored in the second command buffer 480 in the earlier step (FIG. 12). Then, the host computer 20 is notified of "010203" by the second command signal from the first counter 400.

The subsequent steps from this step are repetition of FIGS. 12 and 13, and the counters 400, 500, and 600 continue transmitting the same data (the first command signals and the second command signals) to each other for a predetermined period of time (in this description, two seconds after the power is turned on).

Figure 14:
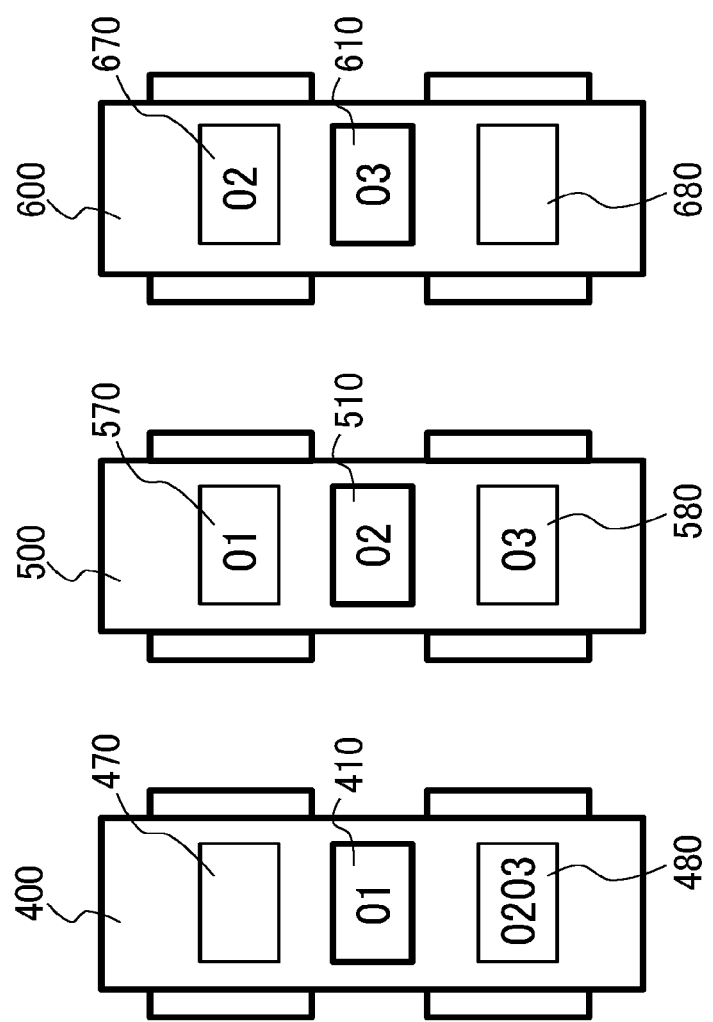
FIG. 14 is a diagram for explaining that the ID numbers are settled in the first operation example.

After the predetermined period of time passes, each of the counters 400, 500, and 600 settles its own ID number as exemplified in FIG. 14. In addition, the host computer 20 and the counters 400, 500, and 600 can recognize the ID numbers of their rear-stage counters from the ID number information stored in the second command buffers 480, 580, and 680.

According to the present exemplary embodiment, it is possible to automatically assign, to the connected multiple counters 100 (400, 500, and 600), ID numbers that are consecutively increased by 1 from that of the forefront-stage counter 400. In addition, it is possible for the upper-level host computer 20 to know the ID numbers of the counters 400, 500, and 600 and for each of the counters 400, 500, and 600 to know, from the on the ID number information stored in the second command buffers 480, 580, and 680 that there are its rear-stage counters and their ID numbers.

If counters are additionally installed, thinned, or replaced, the ID numbers of the counters are automatically appropriately assigned. Thus, the user is released not only from trouble for manually resetting the ID numbers one by one, but also from mental labor for thinking of assignment of complicated ID numbers.

SECOND OPERATION EXAMPLE

Next, a case including a counter whose ID number is fixed is described as a second operation example.

Figure 15:
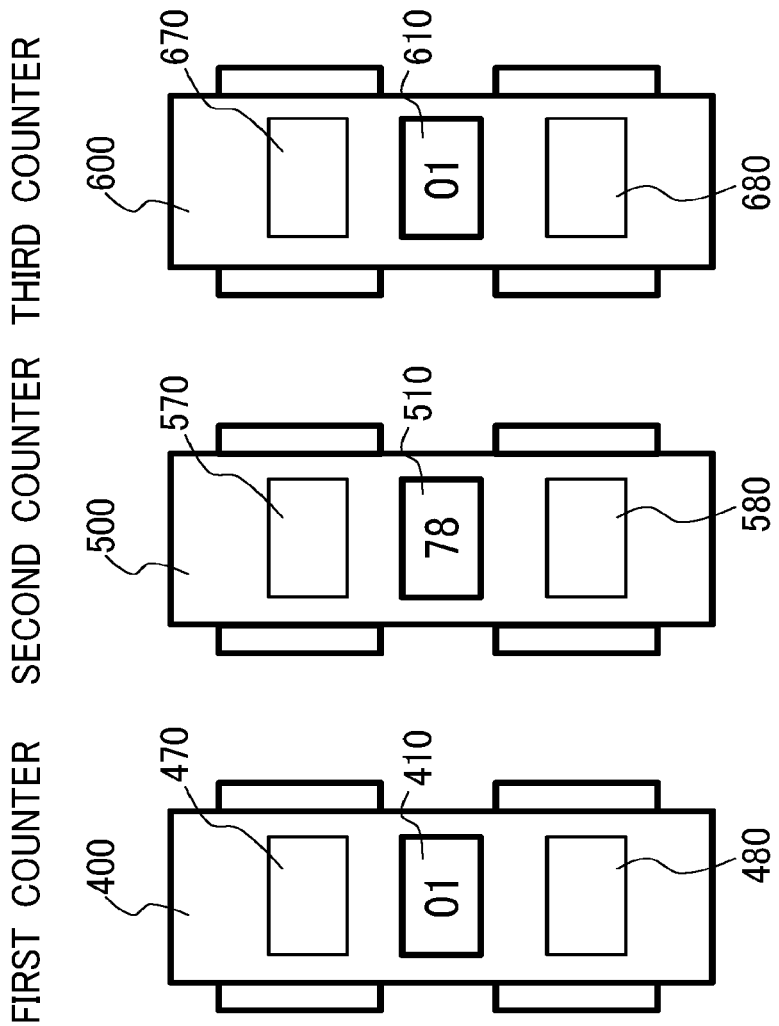
FIG. 15 is a diagram for explaining, as a second operation example, an operation for setting ID numbers of three counters including a counter having a fixed ID number.

FIG. 15 is referred to.

The first counter 400 is the forefront-stage counter 100 of the three counters 100, and the first counter 400 is connected to the host computer 20 (not shown).

Here, the ID number of the second counter 500 is assumed to be fixedly set as "78".

The ID numbers of the first counter 400 and the third counter 600 are to be automatically set.

In FIG. 15, the host computer 20 and the indicator 10 are omitted, and only the counters are shown.

Figure 16:
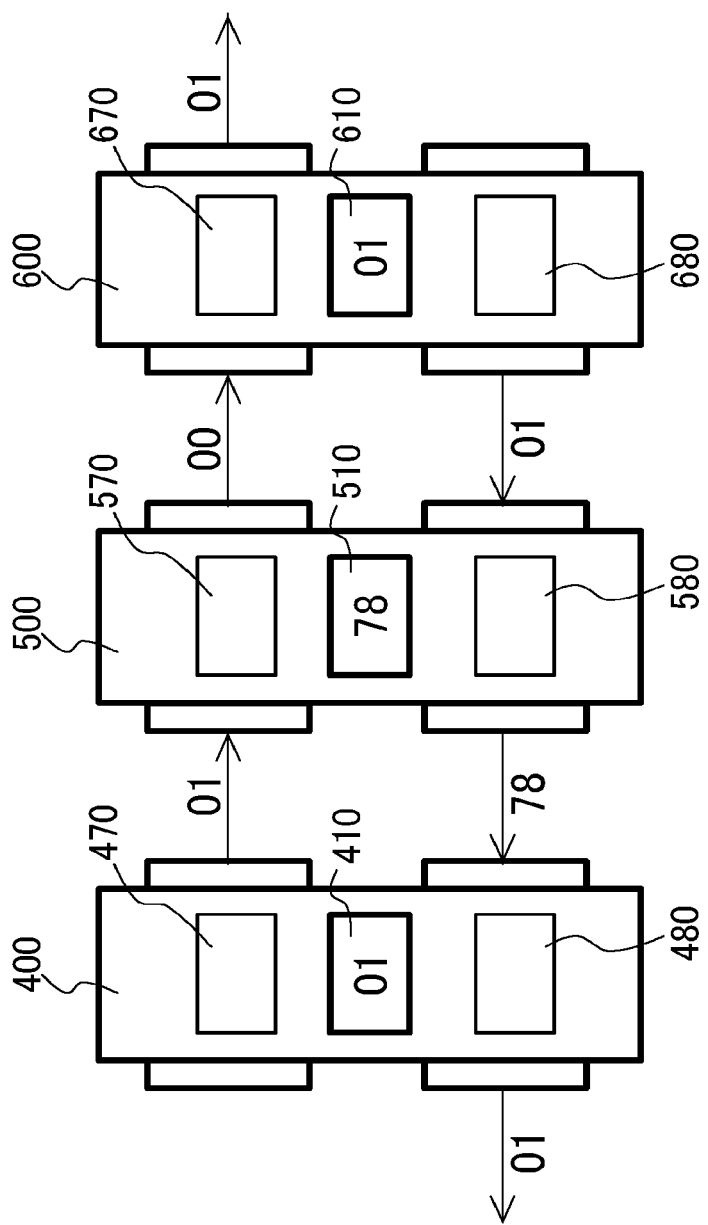
FIG. 16 is a diagram for explaining the second operation example.

FIG. 16 is referred to.

After the power is turned on, each of the counters 400, 500, and 600 outputs a first command signal and a second command signal.

At the beginning, each of the counters 400, 500, and 600 has received no first command signal from any other counters. The ID numbers of the first counter 400 and the third counter 600 are to be automatically set. The first command signal firstly output from each of the counters 400 and 600 whose ID numbers are to be automatically set is its temporary ID "01" set as the initial value.

The ID number of the second counter 500 is fixed.

When a counter has set with a fixed ID, the counter directly transmits the first command signal received from the front-stage counter to the rear-stage counter as its first command signal, but has received no first command signal from any other counters at the beginning.

Here, the ID number contained in the first command signal firstly output from the counter (500) whose ID number is fixed is assumed to be "00".

Note that, the first command signal firstly output from the counter whose ID number is fixed may be any ID number that does not change, for example, "01".

However, considering a case in which the counter whose ID number is fixed can be placed at the forefront-stage, the first command signal firstly output from the counter whose ID number is fixed is preferably the smallest value of ID numbers that are usable in automatic setting or is, as the most suitable example, a value, such as "00", obtained by reducing by one from the minimum ID number "01" that is usable in automatic setting.

The second command signal is described.

Each of the counters 400, 500, and 600 has received no second command signal from any other counters, and the second command signal output from each of the counters 400, 500, and 600 is its own ID number. That is, each of the first counter 400 and the third counter 600 outputs its temporary ID number "01" as the second command signal.

The second counter 500 outputs its own fixed ID number "78" as the second command signal.

Figure 17:
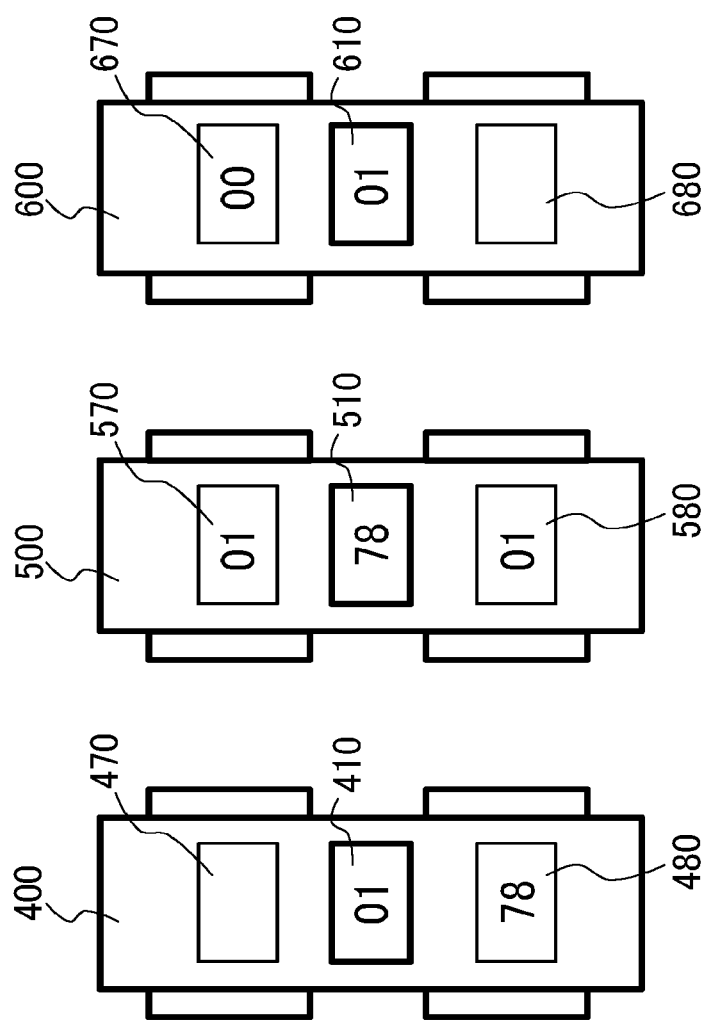
FIG. 17 is a diagram for explaining the second operation example.

FIG. 17 is referred to.

The first counter 400 has received no first command signal from the front stage, and its ID number is not updated and remains "01" that is the initial value.

The ID number of the second counter 500 is "78" that is fixed.

The third counter 600 has received "00" from the second counter 500 as the first command signal, and updates its own ID number by adding "1" to the received first command "00". As a result, the ID number of the third counter 600 remains "01" and is unchanged.

The second command buffers 480, 580, and 680 of the counters 400, 500, and 600 are described.

The first counter 400 stores the second command signal "78" received from the second counter 500 in the second command buffer 480.

The second counter 500 stores the second command signal "01" received from the third counter 600 in the second command buffer 580.

Figure 18:
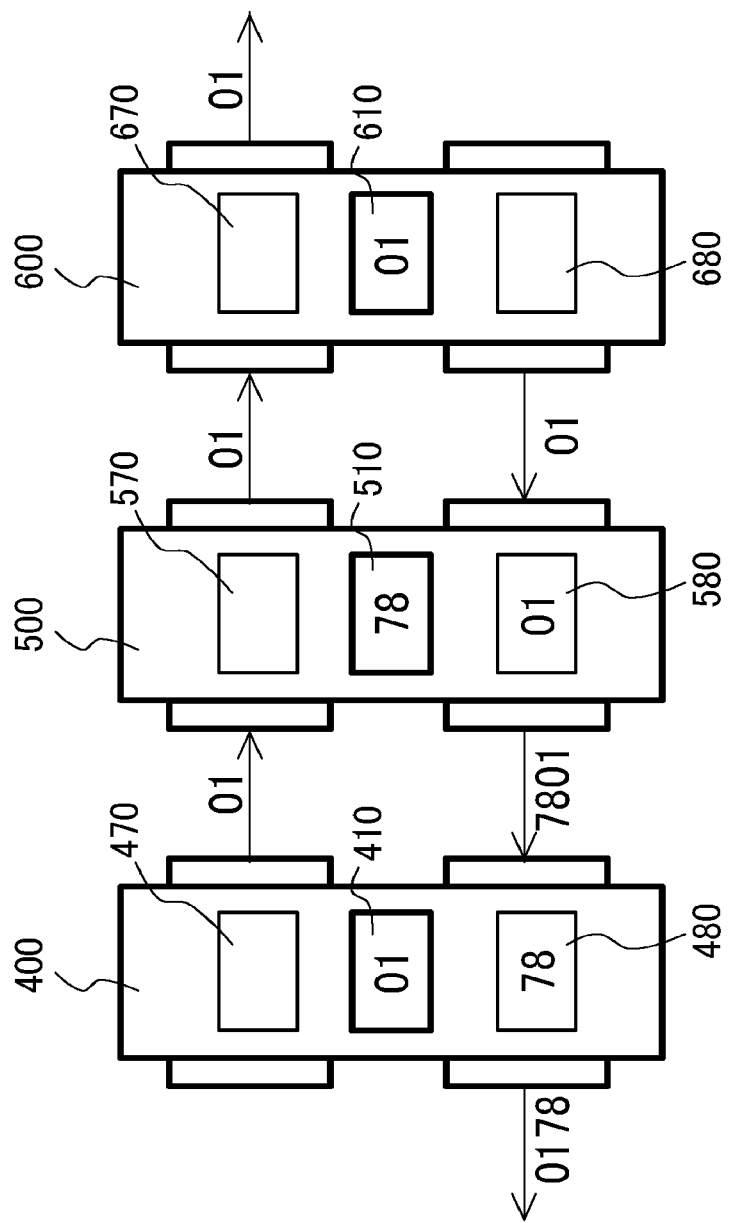
FIG. 18 is a diagram for explaining the second operation example.

Now, FIG. 18 is referred to.

Each of the counters 400, 500, and 600 outputs a first command signal and a second command signal.

Each of the first counter 400 and the third counter 600 uses its own ID number "01" as the first command signal.

The second counter 500 has the fixed ID number. The second counter 500 directly outputs the first command signal "01" received in the earlier step (FIG. 16) from the front-stage counter (the first counter 400) to the rear-stage counter (the third counter 600). That is, the ID number contained in the first command signal output from the second counter 500 in this step (FIG. 18) is "01".

Here, as a modification, a counter whose ID number is fixed may exchange a first command signal similarly to a counter that accepts automatic assignment of an ID number. That is, the counter whose ID number is fixed may start from its temporary ID number "01", update the temporary ID number by adding "1" to the ID number received from the front-stage counter, and transfer its own updated ID number to the rear-stage counter. Then, the counter whose ID number is fixed is only required to eventually use the fixedly set ID number (for example, "78") as its own ID number by discarding the temporary ID number updated automatically. In this case, although the consecutive numbers are broken at the counter whose ID number is fixed, the ID numbers are not overlapped with each other.

The second command signal is now described.

The first counter 400 generates a second command signal "0178" by adding its own ID number "01" in front of the second command signal "78" received from the second counter 500 in the earlier step (FIG. 16).

The second counter 500 generates a second command signal "7801" by adding its own ID number "78" in front of the second command signal "01" received from the third counter 600 in the earlier step (FIG. 16).

The third counter 600 receives no second command signal from any other counters and uses its own ID number "01" as the second command signal.

Figure 19:
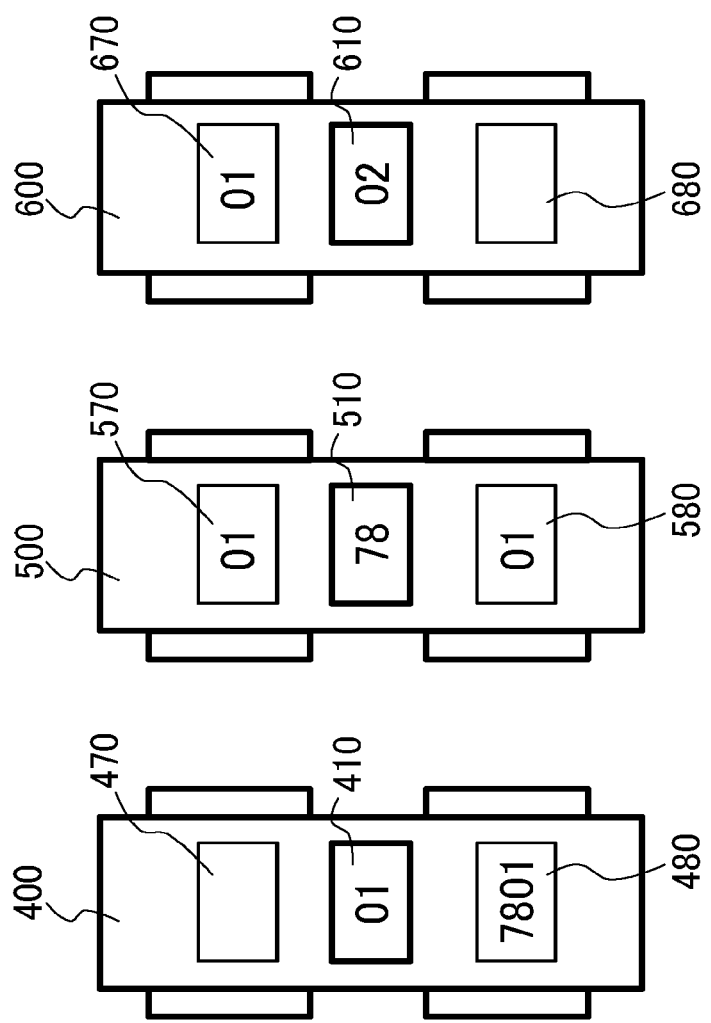
FIG. 19 is a diagram for explaining the second operation example.

FIG. 19 is referred to.

The ID numbers of the first counter 400 and the second counter 500 remain unchanged.

The third counter 600 has received the first command signal "01" from the second counter 500 in the earlier step (FIG. 18) and updates its own ID number to "02" by adding "1" in front of the received first command signal "01".

Regarding the second command buffer 480, the first counter 400 has received the second command signal "7801" from the second counter 500 in the earlier step (FIG. 18) and stores "7801" in the second command buffer 480.

Figure 20:
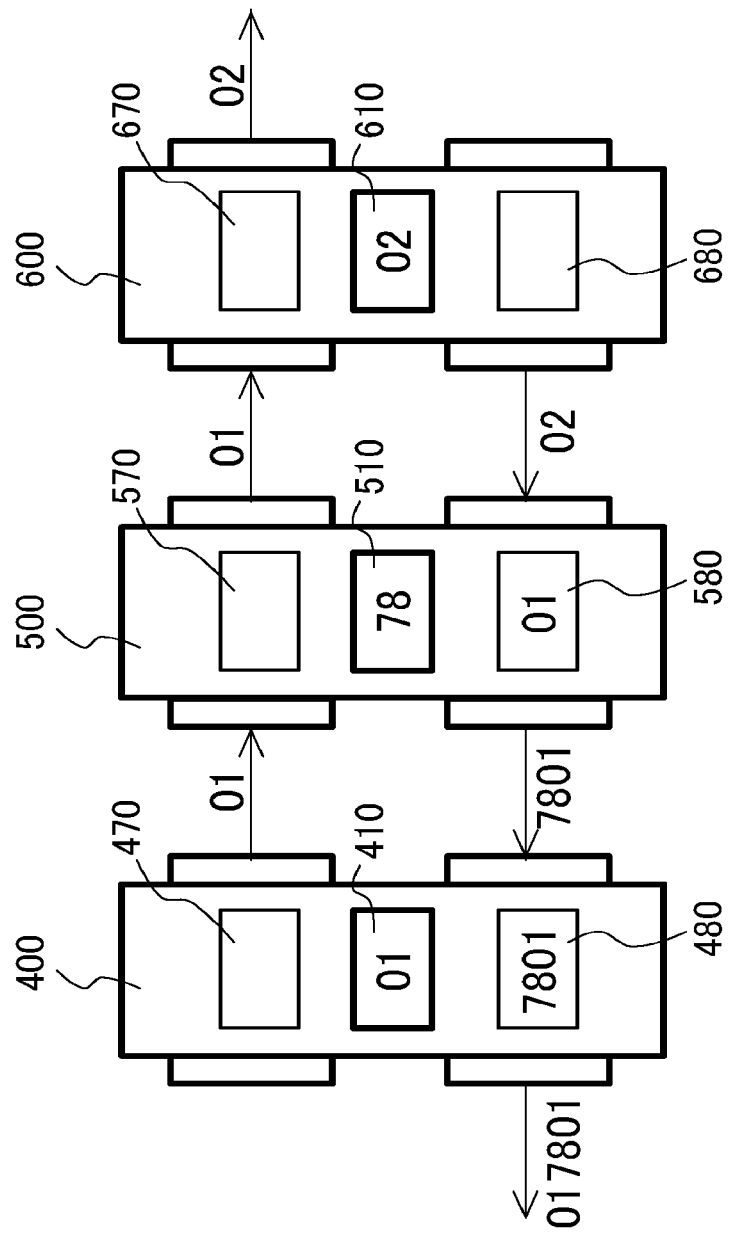
FIG. 20 is a diagram for explaining the second operation example.

FIG. 20 is referred to.

Each of the counters 400, 500, and 600 outputs a first command signal and a second command signal.

Regarding the first command signal, the first command signal output from each of the first counter 400 and the second counter 500 is the same as that in the earlier step (FIG. 18), and a redundant description thereof is omitted.

The ID number contained in the first command signal output from the third counter 600 is "02" that has been updated. However, the third counter 600 has no rear-stage counter to output the first command signal to.

The second command signal is now described.

The first counter 400 generates a second command signal "017801" by adding its own ID number "01" in front of the second command signal "7801" received in the earlier step (FIG. 18).

The second counter 500 generates a second command signal "7801" by adding its own ID number "78" in front of the second command signal "01" received in the earlier step (FIG. 18).

The ID number of the third counter 600 has remained unchanged in the earlier steps (FIGS. 17 and 18), and the second command signal output from the second counter 500 in this step (FIG. 20) is eventually the same as that in the earlier step (FIG. 18).

The third counter 600 outputs its own ID number "02" as the second command signal to the second counter 500.

Figure 21:
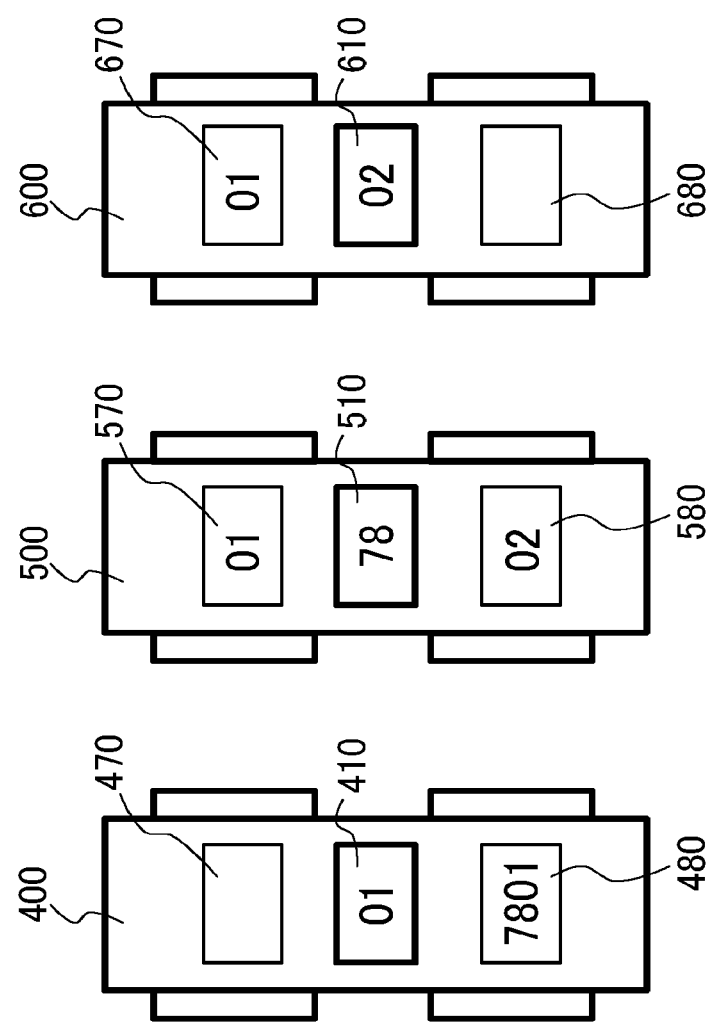
FIG. 21 is a diagram for explaining the second operation example.

FIG. 21 is referred to.

The ID number of the third counter 600 is "02" in the earlier step (FIG. 19) and is larger by "1" than the ID number of the first counter 400 interposing the second counter 500 whose ID number is fixed therebetween. Thus, the ID numbers of the first counter 400 and the third counter 600 remain unchanged.

Regarding the second command buffers 480, 580, and 680, the second counter 500 has received the second command signal "02" from the third counter 600 in the earlier step (FIG. 20) and stores "02" in the second command buffer 580 of the second counter 500.

The ID numbers stored in the second command buffers 480 and 680 of the first counter 400 and the third counter 600 eventually remain unchanged, and a redundant description thereof is omitted.

Figure 22:
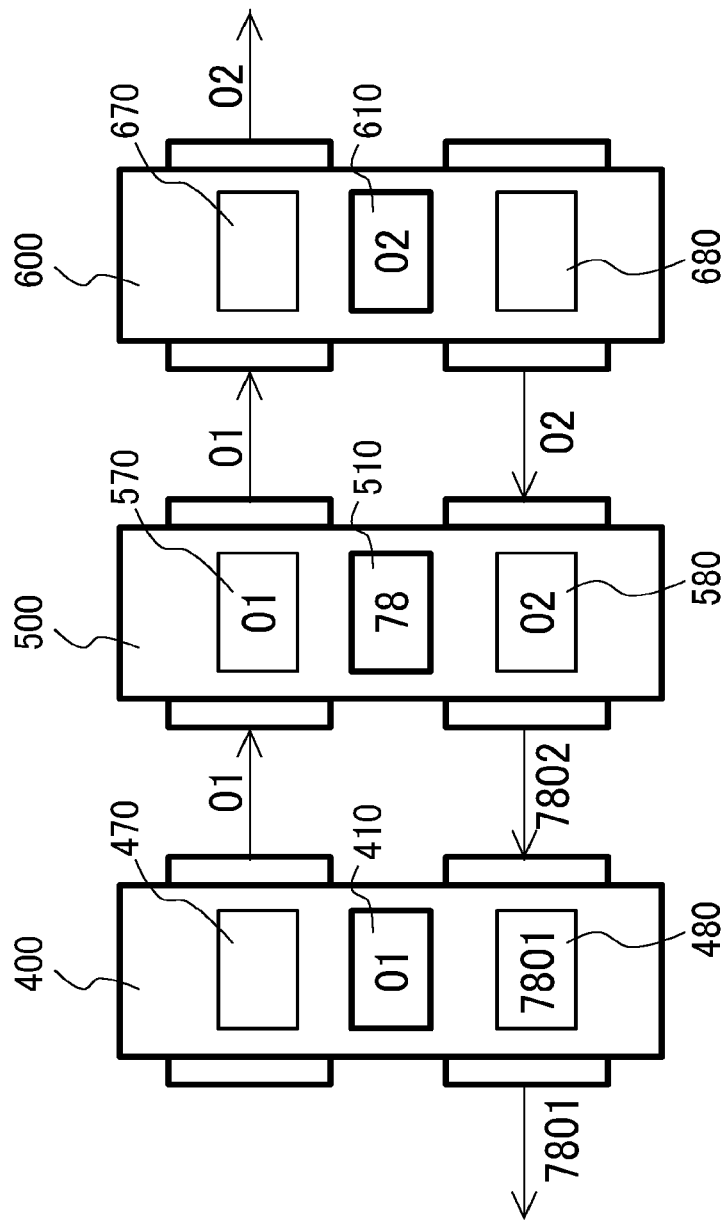
FIG. 22 is a diagram for explaining the second operation example.

FIG. 22 is referred to.

Each of the counters 400, 500, and 600 outputs a first command signal and a second command signal.

The first command signal eventually remains unchanged from that in the earlier step (FIG. 20), and the description thereof is omitted.

Regarding the second command signal, the second counter 500 has received the second command signal "02" from the third counter 600 in the earlier step (FIG. 20) and generates a second command signal "7802" by adding its own ID number "78" in front of the received second command signal.

The second command signal output from each of the first counter 400 and the third counter 600 is eventually the same as that in the earlier step (FIG. 20), and the description thereof is omitted.

Figure 23:
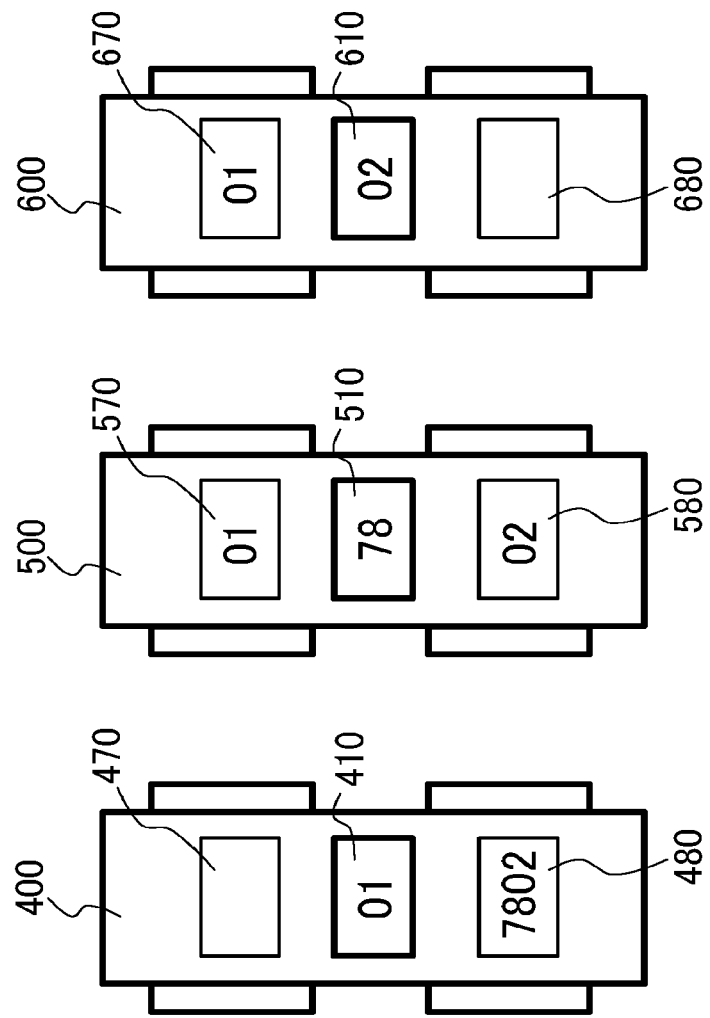
FIG. 23 is a diagram for explaining the second operation example.

FIG. 23 is referred to.

The ID numbers of the first counter 400, the second counter 500, and the third counter 600 remain unchanged.

Regarding the second command buffer 480, the first counter 400 has received the second command signal "7802" from the second counter 500 in the earlier step (FIG. 22), and the second command buffer 480 of the first counter 400 stores "7802".

The ID number stored in the second command buffer 580 of the second counter 500 eventually remains unchanged, and the description is omitted.

Figure 24:
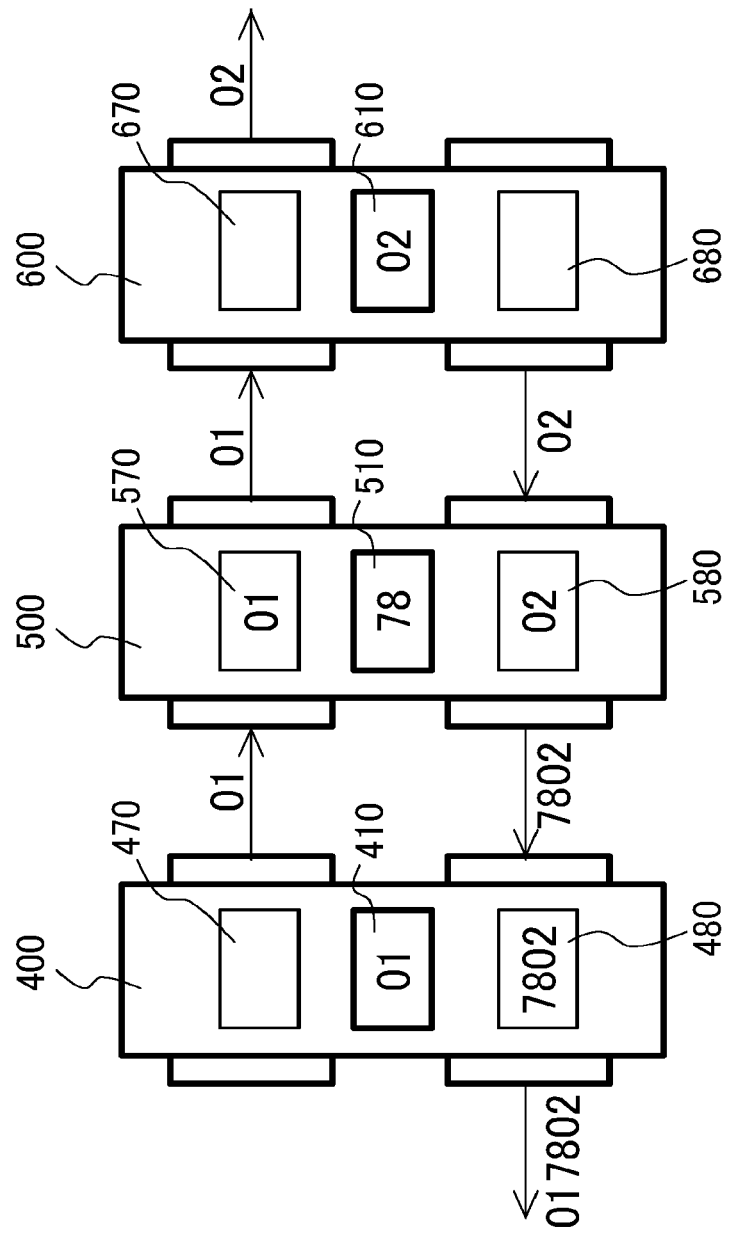
FIG. 24 is a diagram for explaining the second operation example.

FIG. 24 is referred to.

Each of the counters 400, 500, and 600 outputs a first command signal and a second command signal.

The second command signal of the first counter 400 is changed from that in the earlier step (FIG. 22).

The first counter 400 has received the second command signal "7802" from the second counter 500 in the earlier step (FIG. 20) and generates a second command signal "017802" by adding its own ID number "01" in front of the received second command signal.

The subsequent steps from this step are repetition of FIGS. 23 and 24, and the counters 400, 500, and 600 continue transmitting the same data (the first command signals and the second command signals) for a predetermined period of time (in this description, two seconds after the power is turned on).

After the predetermined period of time passes, each of the counters 400, 500, and 600 settles its own ID number as exemplified in FIG. 25. The first counter 400 and the third counter 600 set their own ID number "01" and "02" respectively as the automatically set ID numbers. The second counter 500 sets the fixedly set ID number "78" as its own ID number.

In addition, the host computer 20 and the counters 400, 500, and 600 can recognize the ID numbers of their own rear-stage counters from the ID number information stored in the second command buffers 480, 580, and 680.

According to the present exemplary embodiment, although there is a counter whose ID number is fixedly set and the counter does not accept automatic assignment of an ID number, it is possible to automatically assign ID numbers to other counters that accept automatic assignment of ID numbers. At this time, the ID numbers of the counters that accept automatic assignment of ID numbers are to be consecutive in such a manner as to be increased by 1 from the previous one without a missing number.

Note that, the present invention is not limited to the exemplary embodiment and can be modified without departing from the sprit.

The temporary ID number when the power is turned on has been set to a small value "01", and the ID numbers of rear-stage counters have been set (updated) by being sequentially increased (added) by 1 from the ID number of the forefront-stage counter.

In contrast, the ID number of the forefront-stage counter may be set to a large number (for example, "49"), and the ID numbers of the rear-stage counters may be set (updated) by being sequentially decreased by "1" from the ID number of the forefront-stage counter.

Note that, the ID numbers may be sequentially added or subtracted by "2" as well as being added or subtracted by "1".

It is only required to perform monotonically increasing or decreasing in order for ID numbers not to be overlapped.

The functions of the functional units described in the exemplary embodiment may be implemented by arranging a CPU and a memory to function as a computer, installing a predetermined ID number management program in the memory, and executing the installed program by the CPU or the like. The ID number management program may be distributed by being recorded in a non-volatile recording medium, such as a CD-ROM, a memory card, or the like, or may be downloaded via an internet network or the like.

Indicator
Host computer
100, 400, 500, 600 Counter
110 Display
120 Front-stage input port
130 Front-stage output port
140 Rear-stage output port
150 Rear-stage input port
160 Measuring-machine connection port
171 Displacement detection unit
172 Display control unit
173 Calculation unit
200 ID number management unit
210, 410, 510, 610 ID number holding unit
220 First command generation unit
230 First command output unit
240 Second command generation unit
250 Second command output unit
260 ID number update unit
270, 470, 570, 670 First command buffer
280, 480, 580, 680 Second command buffer

The invention claimed is:

1. A network apparatus comprising a plurality of modules connected in series, wherein
each module of the plurality of modules comprises:
a front-stage input port configured to receive a signal from a corresponding front-stage module;
a front-stage output port configured to output a signal to the corresponding front-stage module;
a rear-stage output port configured to output a signal to a corresponding rear-stage module;
a rear-stage input port configured to receive a signal from the corresponding rear-stage module;
an ID number information holding circuit configured to hold an ID number information of the module;
a first command generation circuit configured to generate a first command instructing notifying of the corresponding rear-stage module of the ID number information;
a first command output circuit configured to output the first command from the rear-stage output port;
a second command generation circuit configured to generate a second command instructing notifying of the corresponding front-stage module of the ID number information and second ID number information of corresponding rear-stage modules;
a second command output circuit configured to output the second command from the front-stage output port; and
an ID number information update circuit configured to set, when the first command is received from the corresponding front-stage module, new ID number information obtained in a calculation by monotonically increasing or decreasing third ID number information of the corresponding front-stage module contained in the received first command as updated ID number information in the ID number information holding circuit, and each of the plurality of modules connected to the network apparatus outputs the first command and the second command to assign the updated ID number for each of the plurality of modules connected to the network apparatus.

2. The network apparatus according to claim 1, wherein the ID number information holding circuit is, when power is turned on, temporarily set with a minimum number usable as an ID number, and the ID number information update circuit of each of the plurality of modules is configured to set, when the first command is received from the corresponding front-stage module, a value obtained by adding a unit of number to an ID number of the corresponding front-stage module contained in the received first command as the ID number information in the ID number information holding circuit.

3. The network apparatus according to claim 1, further comprising a second module whose ID number is fixed, the second module being connected to the network apparatus, wherein the second module whose ID number is fixed is configured to forward, when the first command is received from the corresponding front-stage module, the received first command to the corresponding rear-stage module instead of the ID number information of the module.

4. The network apparatus according to claim 3, wherein when power of the module whose ID number is fixed is turned on, ID number information contained in the first command firstly output from the module whose ID number is fixed is a value reduced by a unit of number from a minimum number usable as an ID number.

5. A control method for a network apparatus including a plurality of modules connected in series and configured to assign an ID number to each of the plurality of modules, each of the plurality of modules including a front-stage input port configured to receive a signal from a corresponding front-stage module; a front-stage output port configured to output a signal to the corresponding front-stage module; a rear-stage output port configured to output a signal to a corresponding rear-stage module; a rear-stage input port configured to receive a signal from the corresponding rear-stage module; and an ID number information holding circuit configured to hold an ID number information of the module, the control method for the network apparatus comprising:

generating a first command instructing notifying of the corresponding rear-stage module of the ID number information;

outputting the first command from the rear-stage output port;

generating a second command instructing notifying of the corresponding front-stage module of the ID number information and second ID number information of corresponding rear-stage modules;

outputting the second command from the front-stage output port; and setting, when the first command is received from the corresponding front-stage module, new ID number information obtained in predetermined calculation by monotonically increasing or decreasing third ID number information of the corresponding front-stage module contained in the received first command as updated ID number information in the ID number information holding circuit, wherein each of the plurality of modules connected to the network apparatus outputs the first command and the second command to assign the updated ID number for each of the plurality of modules connected to the network apparatus.

6. A module configured to set an ID number, the module comprising:

a front-stage input port configured to receive a signal from a corresponding front-stage module;

a front-stage output port configured to output a signal to the corresponding front-stage module;

a rear-stage output port configured to output a signal to a corresponding rear-stage module;

a rear-stage input port configured to receive a signal from the corresponding rear-stage module;

an ID number information holding circuit configured to hold its own ID number information;

a first command generation circuit configured to generate a first command for instructing notifying of the corresponding rear-stage module of the ID number information;

a first command output circuit configured to output the first command from the rear-stage output port;

a second command generation circuit configured to generate a second command for instructing notifying the corresponding front-stage module of an ID number information and ID number information on its rear-stage modules;

a second command output circuit configured to output the second command from the front-stage output port; and an ID number information update circuit configured to set, when the first command is received from the corresponding front-stage module, new ID number information obtained in a calculation by monotonically increasing or decreasing third ID number information of the corresponding front-stage module contained in the received first command as updated ID number information in the ID number information holding circuit, wherein the module being one of a plurality of modules, and each the plurality of modules connected to a network apparatus outputs the first command and the second command to assign a different ID number to each of the plurality of modules.

7. A non-transitory computer readable medium having stored thereon a module ID number management program that when executed by a computer causes the computer to implement a method of managing of an ID number of a module, the module including a front-stage input port configured to receive a signal from a corresponding front-stage module, a front-stage output port configured to output a signal to a corresponding front-stage module, a rear-stage output port configured to output a signal to the corresponding rear-stage module, and a rear-stage input port configured to receive a signal from the corresponding rear-stage module, the method comprising:

holding an ID number information;

generating a first command for instructing notifying of the corresponding rear-stage module of the ID number information;

outputting the first command from the rear-stage output port;

generating a second command for instructing notifying of the corresponding front-stage module of the ID number information and second ID number information of corresponding rear-stage modules;

outputting the second command from the front-stage output port; and setting, when the first command is received from the corresponding front-stage module, new ID number information obtained in a calculation by monotonically increasing or decreasing third ID number information of the corresponding front-stage module contained in the received first command as updated ID number information in the ID number information holding circuit, wherein the module is one of a plurality of modules, and each the plurality of modules connected to a network apparatus outputs the first command and the second command to assign a different ID number to each of the plurality of modules.

* * * * *